(12) United States Patent
Yuasa et al.

(10) Patent No.: US 7,840,120 B2
(45) Date of Patent: Nov. 23, 2010

(54) COMMUNICATION SYSTEM, RECORDING APPARATUS AND METHOD, RECORDING MEDIUM, AND PROGRAM

(75) Inventors: Naoki Yuasa, Chiba (JP); Mie Namai, Tokyo (JP)

(73) Assignee: Sony Corporation, Tokyo (JP)

( * ) Notice: Subject to any disclaimer, the term of this patent is extended or adjusted under 35 U.S.C. 154(b) by 1260 days.

(21) Appl. No.: 11/402,085

(22) Filed: Apr. 12, 2006

(65) Prior Publication Data

US 2006/0239642 A1 Oct. 26, 2006

(30) Foreign Application Priority Data

Apr. 20, 2005 (JP) ............................. 2005-122217

(51) Int. Cl.
*H04N 7/26* (2006.01)
(52) U.S. Cl. ........................ 386/124; 386/95; 386/88; 386/33; 386/35
(58) Field of Classification Search ................. 386/124, 386/33, 35, 88, 95
See application file for complete search history.

(56) References Cited

U.S. PATENT DOCUMENTS

| 6,374,336 | B1 * | 4/2002 | Peters et al. ................. 711/167 |
| 6,546,419 | B1 * | 4/2003 | Humpleman et al. ........ 709/223 |
| 6,766,426 | B1 | 7/2004 | Sugiyama |
| 2001/0005843 | A1 | 6/2001 | Tokashiki |
| 2004/0246534 | A1 * | 12/2004 | Higuchi et al. ............... 358/474 |
| 2005/0251829 | A1 * | 11/2005 | Kondo et al. .................. 725/55 |

FOREIGN PATENT DOCUMENTS

| EP | 0 969 661 A1 | 1/2000 |
| JP | 10-40602 | 2/1998 |
| JP | 11-177919 | 7/1999 |
| JP | 11-317937 | 11/1999 |
| JP | 2000-285598 | 10/2000 |
| JP | 2000-349833 | 12/2000 |
| JP | 2001-339696 | 12/2001 |
| JP | 2003-199004 | 7/2003 |
| WO | WO 02/054761 A1 | 7/2002 |
| WO | WO 2004/114302 A2 | 12/2004 |

OTHER PUBLICATIONS

U.S. Appl. No. 11/550,514, filed Oct. 18, 2006, Yuasa.
U.S. Appl. No. 11/550,161, filed Oct. 17, 2006, Yuasa.

* cited by examiner

*Primary Examiner*—Thai Tran
*Assistant Examiner*—Helen Shibru
(74) *Attorney, Agent, or Firm*—Oblon, Spivak, McClelland, Maier & Neustadt, L.L.P.

(57) ABSTRACT

A communication system includes a first recording apparatus and a second recording apparatus. The first recording apparatus determines whether recording of a broadcast program is settable in the first recording apparatus based on first information for reservation of the recording and second information for selecting an apparatus to be used to record the broadcast program, and transmits third information for requesting the state of the apparatus to the second recording apparatus when the recording is not settable. The second recording apparatus receives the third information from the first recording apparatus, and transmits fourth information to the first recording apparatus in response to the third information. The first recording apparatus further receives the fourth information from the second recording apparatus, evaluates a priority level assigned to the second recording apparatus based on the fourth information, and transmits the first information to the second recording apparatus according to the priority level.

11 Claims, 18 Drawing Sheets

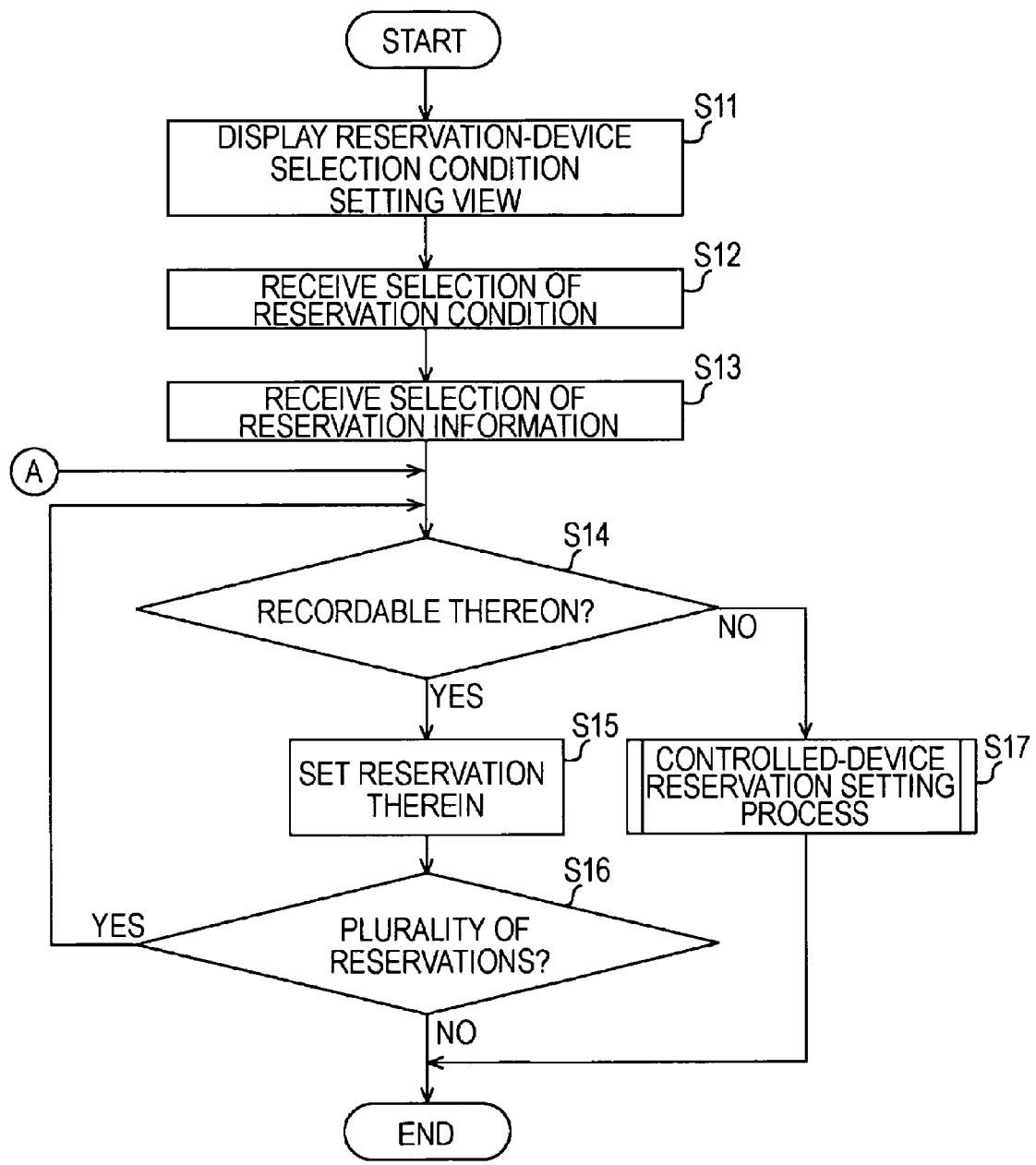

FIG. 7

| CONDITION | CONDITION PARAMETER | EXAMPLE | PRIORITY APPLICABILITY | REMARKS |
|---|---|---|---|---|
| AVAILABLE TUNER | TUNER NAME | TERRESTRIAL ANALOG BROADCAST/TERRESTRIAL DIGITAL BROADCAST/BS ANALOG BROADCAST/BS DIGITAL BROADCAST/CASPER TELEVISION/CASPER TELEVISION 110 | NO | |
| EXTERNAL INPUT | EXTERNAL CONNECTED DEVICE NAME | LIVING ROOM HARD DISK RECORDER | NO | REGISTER NAME OF EXTERNAL CONNECTED DEVICE AND TERMINAL NUMBER OF EXTERNAL INPUT TERMINAL CONNECTED TO THE DEVICE |
| AVAILABLE STORAGE DEVICE | STORAGE DEVICE NAME | HARD DISK/MEMORY CARD/DVD/VHS/BETA/CD/MD/TAPE | APPLICABLE | |
| COMPATIBLE RECORDING FORMAT | CODEC FORMAT | MPEG2/MPEG4/MP3 | APPLICABLE | |
| | RECORDING QUALITY MODE | HIGH QUALITY/LONG TIME | | |
| AVAILABLE RECORDING TIME | REMAINING RECORDING TIME | | NO | SET REMAINING RECORDABLE TIME INFORMATION FOR EACH RECORDING FORMAT |
| RESERVATION STATUS IN RESERVATION TIME ZONE | RESERVATION SETTING INFORMATION | | | |
| RESERVATION AVAILABILITY IN SAME TIME ZONE | SIMULTANEOUS RESERVATION AVAILABILITY INFORMATION | | NO | |
| DEVICE'S INSTALLATION LOCATION | DEVICE INSTALLATION INFORMATION | LIVING ROOM/KITCHEN/STUDY ROOM | APPLICABLE | PRE-REGISTER INSTALLATION LOCATIONS OF DEVICES |
| USER'S REGISTERED DEVICE GROUP | GROUP NAME | FATHER'S DEVICES LIVING ROOM DEVICES | APPLICABLE | PRE-REGISTER GROUP NAMES |
| USER'S REGISTERED TARGET DEVICE | INDIVIDUAL SPECIFICATION INFORMATION | LIVING ROOM HARD DISK RECORDER/LIVING ROOM PC, BEDROOM HARD DISK RECORDER/STUDY ROOM PC/LIVING ROOM TV/LIVING ROOM AMP | APPLICABLE | PRE-REGISTER ALL TARGET DEVICES |
| PRIORITY APPLICABILITY | PRIORITIES IN PARAMETER OF CONDITION "APPLICABLE" IN "PRIORITY APPLICABILITY" | 1: HARD DISK 2: MEMORY CARD 3: DVD | | PRESET PRIORITIES |

FIG. 8

REGISTRATION OF RESERVATION DATA

| CHANNEL | BS DIGITAL BROADCAST | CHANNEL 105 | NHK BS Hi-Vision ~301 |
| --- | --- | --- | --- |
| RESERVATION TIME | 20 : 00 - 20 : 50 ~302 | | |
| RECORDING QUALITY | ● SPECIFY QUALITY | | PRIORITY-BASED ~303 |
| | ○ SPECIFY RECORDING FORMAT | | MPEG2 ~304 |

| PRIORITY | 1 | HIGH QUALITY | 2 | LONG TIME |
| --- | --- | --- | --- | --- |
| | 1 | MPEG2 | 2 | MPEG4 |

~305

REGISTRATION OF RESERVATION CONDITIONS

STORAGE DEVICE  HARD DISK ~306

TARGET DEVICE
○ ALL DEVICES
● GROUP
○ SPECIFY LOCATION
○ SPECIFY DEVICE

~307
FATHER'S DEVICES
LIVING ROOM
LIVING ROOM HARD DISK RECORDER   LIVING ROOM PC
BEDROOM HARD DISK RECORDER   STUDY ROOM PC

FIG. 10

| STATUS REQUEST |
|---|
| TUNER NAME |
| EXTERNAL CONNECTED DEVICE NAME |
| STORAGE DEVICE NAME |
| CODEC FORMAT |
| RECORDING-QUALITY MODE |
| REMAINING RECORDING TIME |
| RESERVATION SETTING INFORMATION |
| SIMULTANEOUS RESERVATION AVAILABILITY INFORMATION |

FIG. 11

| STATUS RESPONSE | |
|---|---|
| TUNER NAME | BS DIGITAL BROADCAST |
| EXTERNAL CONNECTED DEVICE NAME | CHILD'S ROOM HARD DISK RECORDER |
| STORAGE DEVICE NAME | HARD DISK |
| CODEC FORMAT | MPEG2 |
| RECORDING-QUALITY MODE | HIGH QUALITY/LONG TIME |
| REMAINING RECORDING TIME | HIGH QUALITY: 1 HR<br>LONG TIME: 2 HR |
| RESERVATION SETTING INFORMATION | 21:00 TO 22:00 |
| SIMULTANEOUS RESERVATION AVAILABILITY INFORMATION | NO |

| RESERVATION INFORMATION | |
|---|---|
| TUNER NAME | TUNER NAME |
| RESERVATION TIME | 20:00 TO 20:59 |
| RECORDING-QUALITY MODE | 1: HIGH QUALITY/2: LONG TIME |

COMMUNICATION SYSTEM, RECORDING APPARATUS AND METHOD, RECORDING MEDIUM, AND PROGRAM

CROSS REFERENCES TO RELATED APPLICATIONS

The present invention contains subject matter related to Japanese Patent Application JP 2005-122217 filed in the Japanese Patent Office on Apr. 20, 2005, the entire contents of which are incorporated herein by reference.

BACKGROUND OF THE INVENTION

1. Field of the Invention

The present invention relates to communication systems, recording apparatuses and methods, recording media, and programs. More specifically, the present invention relates to a communication system, a recording apparatus and method, a recording medium, and a program in which broadcast programs can be recorded without fail.

2. Description of the Related Art

Recently, video recorders having large recording capacities, such as hard disk recorders and digital versatile disc (DVD) recorders, have increasingly become popular. In general, such video recorders perform recording of reserved broadcast programs by recording the reserved broadcast programs on storage devices of the recorders, such as hard disk drives (HDDs). Some of the video recorders include a plurality of built-in tuners, and enable simultaneous recording of a plurality of broadcast programs in the same time zone.

A broadcast signal recording apparatus disclosed in, for example, Japanese Unexamined Patent Application Publication No. 2003-199004 includes a recording function for recording a broadcast program information signal fed from a tuner on a hard disk or the like, a network interface for transmitting and receiving reservation information to and from an external broadcast signal recording apparatus, and a microcomputer. The microcomputer determines whether to perform recording using the broadcast signal recording apparatus or the external broadcast signal recording apparatus according to the given reservation information, and controls the recording in the broadcast signal recording apparatus or the external broadcast signal recording apparatus depending on the recording reservation status.

SUMMARY OF THE INVENTION

When a user desires to record a plurality of broadcast programs, however, there is the possibility of the user not being able to record the desired broadcast programs because of the limited number of broadcast programs that can simultaneously be recorded on a storage device.

The broadcast signal recording apparatus disclosed in Japanese Unexamined Patent Application Publication No. 2003-199004 is connected to a network. When the apparatus is not set to record a broadcast program, the apparatus sets a recording reservation in other equipment via the network to record the broadcast program. In this arrangement, an apparatus capable of setting a recording reservation in other equipment via a network exists, and sets a recording reservation therein. When the recording reservation is not settable, the apparatus sets a recording reservation in other equipment. It is premised that apparatuses having these functions exist. Thus, this arrangement may not be optimum.

Further, if a recording reservation is settable in an apparatus, the state of the apparatus constantly changes, and the desired broadcast program may not be recorded due to the possibility of no recording medium being set in the apparatus or insufficient recording capacity of the recording medium at the set reservation time.

It is therefore desirable to record broadcast programs without fail.

According to an embodiment of the present invention, there is provided a communication system including a first recording apparatus, and a second recording apparatus. The first recording apparatus includes the following elements. Determining means determines whether or not recording of a broadcast program is settable in the first recording apparatus on the basis of first information for reservation of the recording of the broadcast program and second information for selecting an apparatus to be used to record the broadcast program. First transmitting means transmits third information for requesting the state of the apparatus corresponding to the second information to the second recording apparatus when it is determined that the recording is not settable. The second recording apparatus includes the following elements. First receiving means receives the third information transmitted from the first recording apparatus. Second transmitting means transmits fourth information concerning the state of the second recording apparatus to the first recording apparatus in response to the third information. The first recording apparatus further includes the following elements. Second receiving means receives the fourth information transmitted from the second recording apparatus. Evaluating means evaluates a priority level assigned to the second recording apparatus that has transmitted the fourth information on the basis of the fourth information. The first transmitting means transmits the first information to the second recording apparatus according to the priority level.

According to another embodiment of the present invention, there is provided a recording apparatus including the following elements. First determining means determines whether or not recording of a broadcast program is settable in the recording apparatus on the basis of first information for reservation of the recording of the broadcast program and second information for selecting an apparatus to be used to record the broadcast program. Transmitting means transmits third information for requesting the state of the apparatus corresponding to the second information to other apparatuses when it is determined that the recording is not settable. Receiving means receives fourth information concerning the state of the other apparatuses transmitted from the other apparatuses in response to the third information. Evaluating means evaluates priority levels assigned to the other apparatuses that have transmitted the fourth information on the basis of the fourth information. The transmitting means transmits the first information to the other apparatuses according to the priority levels.

The recording apparatus may further include the following elements. First accepting means accepts a selection of the first information according to an operation performed by a user. Second accepting means accepts a selection of the second information according to an operation performed by the user. The first determining means may determine whether or not recording of the broadcast program is settable in the recording apparatus on the basis of the selected first information and the selected second information.

The recording apparatus may further include generating means for generating the third information based on the second information, and the transmitting means may transmit the generated third information to the other apparatuses.

The recording apparatus may further include generating means for generating fifth information for sharing the recording of the broadcast program between a plurality of the other apparatuses based on the fourth information and the priority levels, and the transmitting means may transmit the generated fifth information to the other apparatuses.

The recording apparatus may further include second determining means for determining whether or not the recording apparatus is able to record the broadcast program thereon at a time a predetermined time before a set recording start time of the broadcast program. When it is determined that the recording is not settable, the transmitting means transmits the third information to the other apparatuses.

The receiving means may receive fifth information transmitted from one of the other apparatuses indicating that the one apparatus is not able to record a reserved broadcast program, and the transmitting means may transmit the third information to another of the other apparatuses in response to the received fifth information.

According to another embodiment of the present invention, there is provided a recording method. The recording method includes the steps of determining whether or not recording of a broadcast program is settable on the basis of first information for reservation of the recording of the broadcast program and second information for selecting an apparatus to be used to record the broadcast program; controlling transmission of third information for requesting the state of the apparatus corresponding to the second information to other apparatuses when it is determined that the recording is not settable; controlling reception of fourth information concerning the state of the other apparatuses transmitted from the other apparatuses in response to the third information; and evaluating priority levels assigned to the other apparatuses that have transmitted the fourth information on the basis of the fourth information. In the step of controlling transmission, transmission of the first information to the other apparatuses is controlled according to the priority levels.

According to another embodiment of the present invention, there is provided a program including the steps of determining whether or not recording of a broadcast program is settable on the basis of first information for reservation of the recording of the broadcast program and second information for selecting an apparatus to be used to record the broadcast program; controlling transmission of third information for requesting the state of the apparatus corresponding to the second information to other apparatuses when it is determined that the recording is not settable; controlling reception of fourth information concerning the state of the other apparatuses transmitted from the other apparatuses in response to the third information; and evaluating priority levels assigned to the other apparatuses that have transmitted the fourth information on the basis of the fourth information. In the step of controlling transmission, transmission of the first information to the other apparatuses is controlled according to the priority levels.

According to another embodiment of the present invention, there is provided a recording apparatus. The recording apparatus includes the following elements. Receiving means receives first information for requesting the state of the recording apparatus corresponding to an item for selecting an apparatus to be used to record a broadcast program, the first information being transmitted from another apparatus. Transmitting means transmits second information concerning the state of the recording apparatus to the another apparatus in response to the first information.

The recording apparatus may further include generating means for generating the second information based on the received first information, and the transmitting means may transmit the generated second information to the another apparatus.

The recording apparatus may further include determining means for determining whether or not the recording apparatus is able to record a reserved broadcast program at the elapse of a predetermined time. When it is determined that the recording is not settable, the transmitting means may transmit third information indicating that the recording apparatus is not able to record the broadcast program to the another apparatus.

According to another embodiment of the present invention, there is provided a recording method for a recording apparatus. The recording method includes the steps of controlling reception of first information for requesting the state of the recording apparatus corresponding to an item for selecting an apparatus to be used to record a broadcast program, the first information being transmitted from another apparatus; and controlling transmission of second information concerning the state of the recording apparatus to the another apparatus in response to the first information.

According to another embodiment of the present invention, there is provided a program including the steps of controlling reception of first information for requesting the state of a recording apparatus corresponding to an item for selecting an apparatus to be used to record a broadcast program, the first information being transmitted from another apparatus; and controlling transmission of second information concerning the state of the recording apparatus to the another apparatus in response to the first information.

In a communication system according to an embodiment of the present invention, a first recording apparatus determines whether or not recording of a broadcast program is settable in the first recording apparatus on the basis of first information for reservation of the recording of the broadcast program and second information for selecting an apparatus to be used to record the broadcast program. When it is determined that the recording is not settable, the first recording apparatus transmits third information for requesting the state of the apparatus corresponding to the second information to a second recording apparatus. The second recording apparatus receives the third information transmitted from the first recording apparatus, and transmits fourth information concerning the state of the second recording apparatus to the first recording apparatus in response to the third information. Further, the first recording apparatus receives the fourth information transmitted from the second recording apparatus, evaluates a priority level assigned to the second recording apparatus that has transmitted the fourth information on the basis of the fourth information, and transmits the first information to the second recording apparatus according to the priority level.

In a recording apparatus and method, recording medium, and program according to embodiments of the present invention, it is determined whether or not recording of a broadcast program is settable in the recording apparatus on the basis of first information for reservation of the recording of the broadcast program and second information for selecting an apparatus to be used to record the broadcast program. When it is determined that the recording is not settable, third information for requesting the state of the apparatus corresponding to the second information is transmitted to other apparatuses, and fourth information concerning the state of the other apparatuses transmitted from the other apparatuses in response to the third information is received. Priority levels assigned to the other apparatuses that have transmitted the fourth information are evaluated on the basis of the fourth information, and the first information is transmitted to the other apparatuses according to the priority level.

In a recording apparatus and method, a recording medium, and a program according to embodiments of the present invention, first information for requesting the state of the recording apparatus corresponding to an item for selecting an apparatus to be used to record a broadcast program is received from another apparatus, and second information concerning the state of the recording apparatus is transmitted to the another apparatus in response to the first information.

According to an embodiment of the present invention, a broadcast program can be recorded. Further, according to an embodiment of the present invention, a broadcast program can be recorded without fail.

BRIEF DESCRIPTION OF THE DRAWINGS

FIG. 6 is a flowchart showing a reservation setting process by the controller;

FIG. 7 is an illustration of exemplary device setting information;

FIG. 8 is an exemplary reservation-device selection condition setting view displayed on an LCD screen;

FIG. 10 is a diagram showing an exemplary status request;

FIG. 11 is a diagram showing an exemplary status response;

DESCRIPTION OF THE PREFERRED EMBODIMENTS

Figure 1:
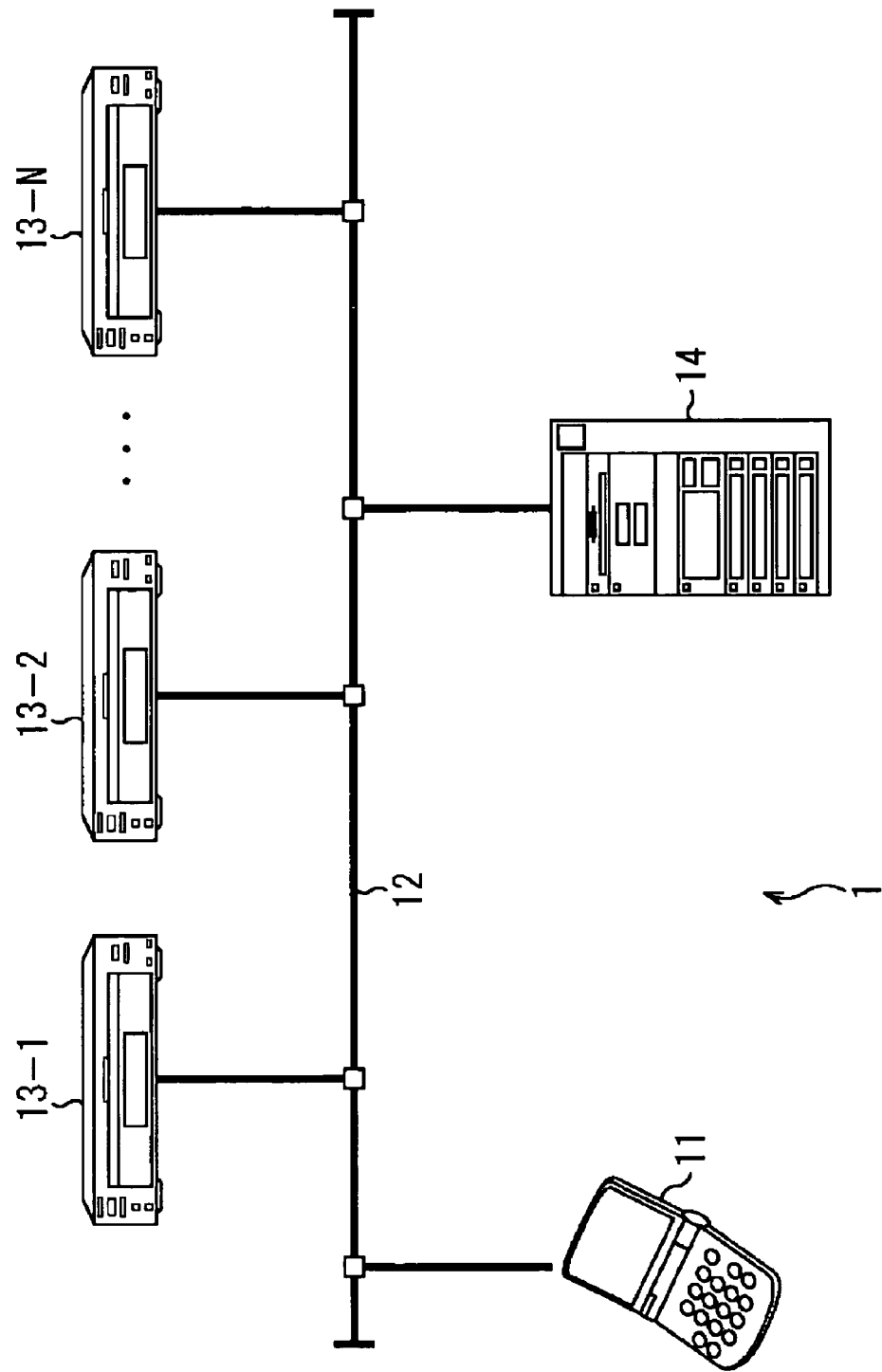
FIG. 1 is a block diagram of a video recording reservation system according to an embodiment of the present invention.

Before describing an embodiment of the present invention, the correspondence between the features of the claims and the specific elements disclosed in an embodiment of the present invention is discussed below. Even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, there is provided a communication system. In the communication system (e.g., a video recording reservation system 1 shown in FIG. 1), a first recording apparatus (e.g., a controller 11 shown in FIG. 1) includes determining means (e.g., a reservation availability determining unit 111 shown in FIG. 4) for determining whether or not recording of a broadcast program is settable in the first recording apparatus on the basis of first information for reservation of the recording of the broadcast program and second information for selecting an apparatus to be used to record the broadcast program, and first transmitting means (e.g., a transmitter 131 shown in FIG. 4) for transmitting third information for requesting the state of the apparatus corresponding to the second information to a second recording apparatus when it is determined that the recording is not settable. The second recording apparatus (e.g., a video recorder 13 shown in FIG. 1) includes first receiving means (e.g., a receiver 222 shown in FIG. 5) for receiving the third information transmitted from the first recording apparatus, and second transmitting means (e.g., a transmitter 221 shown in FIG. 5) for transmitting fourth information concerning the state of the second recording apparatus to the first recording apparatus in response to the third information. The first recording apparatus further includes second receiving means (e.g., a receiver 132 shown in FIG. 4) for receiving the fourth information transmitted from the second recording apparatus, and evaluating means (e.g., a device evaluating unit 123 shown in FIG. 4) for evaluating a priority level assigned to the second recording apparatus that has transmitted the fourth information on the basis of the fourth information. The first transmitting means transmits the first information to the second recording apparatus according to the priority level.

According to another embodiment of the present invention, there is provided a recording apparatus. The recording apparatus (e.g., a controller 11 shown in FIG. 1) includes first determining means (e.g., a reservation availability determining unit 111 shown in FIG. 4) for determining whether or not recording of a broadcast program is settable in the recording apparatus on the basis of first information for reservation of the recording of the broadcast program and second information for selecting an apparatus to be used to record the broadcast program, transmitting means (e.g., a transmitter 131 shown in FIG. 4) for transmitting third information for requesting the state of the apparatus corresponding to the second information to other apparatuses when it is determined that the recording is not settable, receiving means (e.g., a receiver 132 shown in FIG. 4) for receiving fourth information concerning the state of the other apparatuses transmitted from the other apparatuses in response to the third information, and evaluating means (e.g., a device evaluating unit 123 shown in FIG. 4) for evaluating priority levels assigned to the other apparatuses that have transmitted the fourth information on the basis of the fourth information. The transmitting means transmits the first information to the other apparatuses according to the priority levels.

The recording apparatus may further include first accepting means (e.g., a reservation information setting unit 104 shown in FIG. 4) for accepting a selection of the first information according to an operation performed by a user, and second accepting means (e.g., a reservation condition setting unit 103 shown in FIG. 4) for accepting a selection of the second information according to an operation performed by the user. The first determining means may determine whether or not the recording of the broadcast program is settable in the recording apparatus on the basis of the selected first information and the selected second information.

The recording apparatus may further include generating means (e.g., a status request generator 122 shown in FIG. 4) for generating the third information based on the second information, and the transmitting means may transmit the generated third information to the other apparatuses.

The recording apparatus may further include generating means (e.g., a reservation sharing processor 125 shown in FIG. 4) for generating fifth information for sharing the recording of the broadcast program between a plurality of the other apparatuses based on the fourth information and the priority levels, and the transmitting means may transmit the generated fifth information to the other apparatuses.

The recording apparatus may further include second determining means (e.g., a recording processor 108 shown in FIG. 4) for determining whether or not the recording apparatus is able to record the broadcast program thereon at a time a predetermined time before a set recording start time of the broadcast program. When it is determined that the recording is not settable, the transmitting means may transmit the third information to the other apparatuses.

The receiving means may receive fifth information transmitted from one of the other apparatuses indicating that the one apparatus is not able to record a reserved broadcast program, and the transmitting means may transmit the third information to another of the apparatuses in response to the received fifth information.

According to another embodiment of the present invention, there is provided a recording method. The recording method includes the steps of determining (e.g., the processing of step S14 shown in FIG. 6) whether or not recording of a broadcast program is settable on the basis of first information for reservation of the recording of the broadcast program and second information for selecting an apparatus to be used to record the broadcast program; controlling (e.g., the processing of step S33 shown in FIG. 9) transmission of third information for requesting the state of the apparatus corresponding to the second information to another apparatus when it is determined that the recording is not settable; controlling (e.g., the processing of step S34 shown in FIG. 9) reception of fourth information concerning the state of the other apparatuses transmitted from the other apparatuses in response to the third information; and evaluating (e.g., the processing of step S35 shown in FIG. 9) priority levels assigned to the other apparatuses that have transmitted the fourth information on the basis of the fourth information. In the step of controlling transmission (e.g., the processing of step S39 shown in FIG. 9), transmission of the first information to the other apparatuses is controlled according to the priority levels.

According to an embodiment of the present invention, there is provided a program. The program includes the steps of determining (e.g., the processing of step S14 shown in FIG. 6) whether or not recording of a broadcast program is settable on the basis of first information for reservation of the recording of the broadcast program and second information for selecting an apparatus to be used to record the broadcast program; controlling (e.g., the processing of step S33 shown in FIG. 9) transmission of third information concerning a request for the state of the apparatus corresponding to the second information to other apparatuses when it is determined that the recording is not settable; controlling (e.g., the processing of step S34 shown in FIG. 9) reception of fourth information concerning the state of the other apparatuses transmitted from the other apparatuses in response to the third information; and evaluating (e.g., the processing of step S35 shown in FIG. 9) priority levels assigned to the other apparatuses that have transmitted the fourth information on the basis of the fourth information. In the step of controlling transmission (e.g., the processing of step S39 shown in FIG. 9), transmission of the first information to the other apparatuses is controlled according to the priority levels.

According to another embodiment of the present invention, there is provided a recording apparatus. The recording apparatus (e.g., a video recorder 13 shown in FIG. 1) includes receiving means (e.g., a receiver 222 shown in FIG. 5) for receiving first information for requesting the state of the recording apparatus corresponding to an item for selecting an apparatus to be used to record a broadcast program, the first information being transmitted from another apparatus, and transmitting means (e.g., a transmitter 221 shown in FIG. 5) for transmitting second information concerning the state of the recording apparatus to the another apparatus in response to the first information.

The recording apparatus may further include generating means (e.g., a status response generator 211 shown in FIG. 5) for generating the second information based on the received first information, and the transmitting means may transmit the generated second information to the another apparatus.

The recording apparatus may further include determining means (e.g., a recording processor 205 shown in FIG. 5) for determining whether or not the recording apparatus is able to record a reserved broadcast program at the elapse of a predetermined time. When it is determined that the recording is not settable, the transmitting means may transmit third information indicating that the recording apparatus is not able to record the broadcast program to the another apparatus.

According to another embodiment of the present invention, there is provided a recording method. The recording method includes the steps of controlling (e.g., the processing of step S151 shown in FIG. 16) reception of first information for requesting the state of a recording apparatus corresponding to an item for selecting an apparatus to be used to record a broadcast program, the first information being transmitted from another apparatus; and controlling (e.g., the processing of step S153 shown in FIG. 16) transmission of second information concerning the state of the recording apparatus to the another apparatus in response to the first information.

According to another embodiment of the present invention, there is provided a program. The program includes the steps of controlling (e.g., the processing of step S151 shown in FIG. 16) reception of first information for requesting the state of a recording apparatus corresponding to an item for selecting an apparatus to be used to record a broadcast program, the first information being transmitted from another apparatus; and controlling (e.g., the processing of step S153 shown in FIG. 16) transmission of second information concerning the state of the recording apparatus to the another apparatus in response to the first information.

Figure 2:
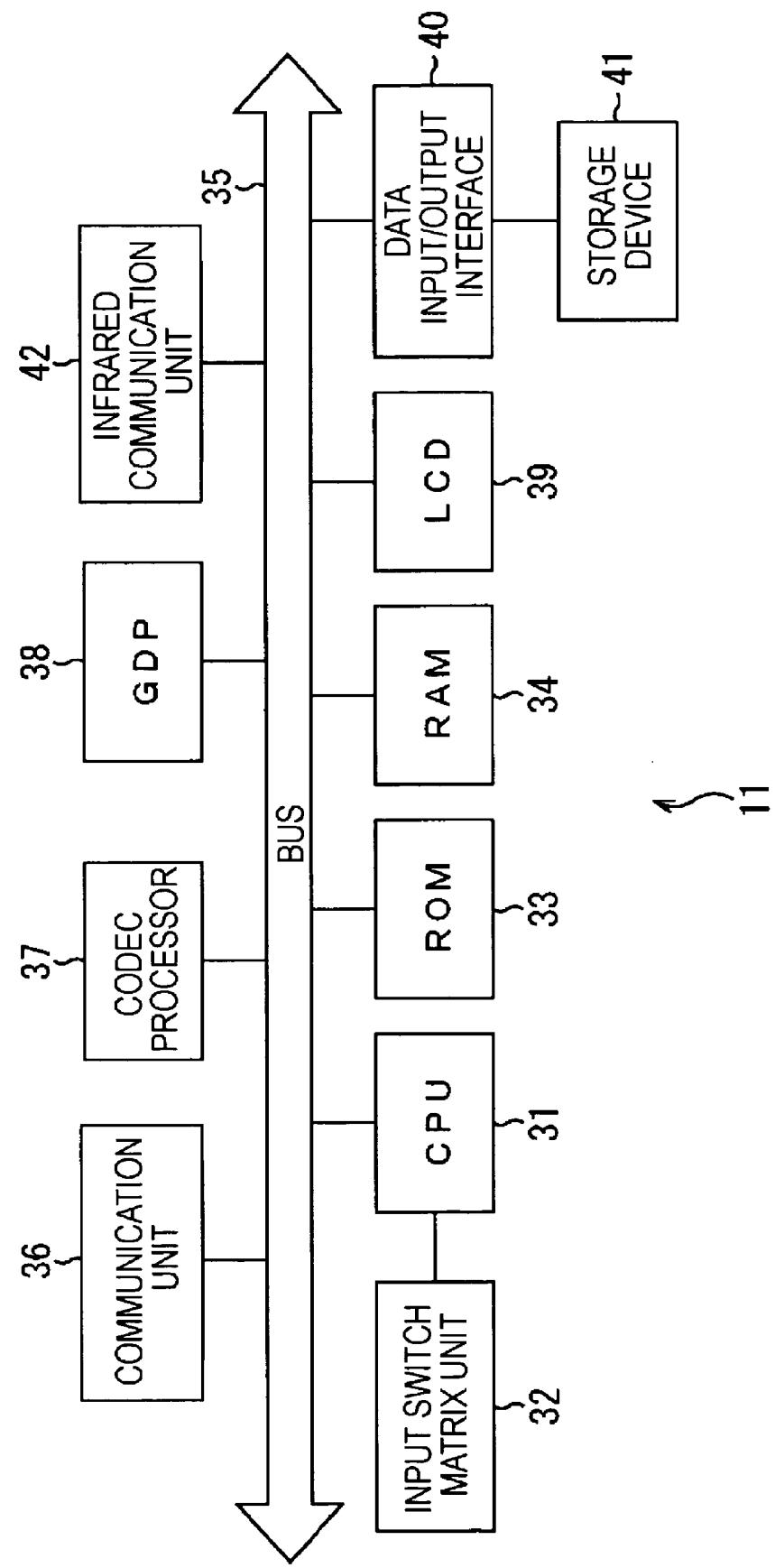
FIG. 2 is a block diagram showing an example structure of a controller.

The program may be recorded on a recording medium (e.g., a storage device 41 shown in FIG. 2).

An embodiment of the present invention will be described hereinafter with reference to the drawings.

FIG. 1 is a block diagram of a video recording reservation system 1 according to an embodiment of the present invention.

The video recording reservation system 1 is an exemplary implementation of a communication system according to an embodiment of the present invention. In the video recording reservation system 1, a controller 11, video recorders 13-1 to 13-N, and a server 14 are connected to a network 12.

The controller 11 is an exemplary implementation of a recording apparatus according to an embodiment of the present invention, and may be a piece of terminal equipment accessible to the network 12, such as dedicated terminal equipment or multi-purpose terminal equipment also used as a personal digital assistant (PDA) or a game device.

The controller 11 transmits a status request to each of the video recorders 13-1 to 13-N via the network 12. The controller 11 receives a status response to the status request from each of the video recorders 13-1 to 13-N via the network 12.

The status request is a request for the status of each of the video recorders 13-1 to 13-N, as described in detail below. For example, the status request includes information, such as a tuner name indicating the name of an available tuner, an external connected device name indicating the name of a device that can be connected to the external input, a storage device name indicating the name of an available storage device, a codec format or a recording-quality mode indicating a recording format compatible with the available storage device, remaining recording time indicating available recording time, reservation setting information indicating the status of a recording reservation scheduled in a reservation time zone, or simultaneous reservation availability information indicating availability of recording reservations in the same time zone.

The status response includes information indicating the status of each of the video recorders 13-1 to 13-N in response to the status request, as described in detail below. For example, the status response includes information responsive to the status request, such as tuner name "BS digital broadcast", external connected device name "living room hard disk recorder", storage device name "hard disk", codec format "MPEG2", recording-quality mode "high quality", remaining recording time "30 minutes", and reservation setting information "21:00 to 22:00", or simultaneous reservation availability information indicating "reservations available in the same time zone".

The controller 11 transmits reservation information to any of the video recorders 13-1 to 13-N via the network 12. For example, when the recording is not settable in the controller 11, it transmits reservation information to one of the video recorders 13-1 to 13-N to set a recording reservation in the one of the video recorders 13-1 to 13-N.

The reservation information is set by the user and is information for reservation of recording of a broadcast program. For example, the reservation information includes information, such as the channel of the reserved broadcast program, reservation time, or a recording-quality mode such as a high-quality recording mode or long-time recording mode.

The network 12 is composed of, for example, a wireless local area network (LAN) complying with the IEEE (the Institute of Electrical and Electronic Engineers, Inc.) 802.11 standard or a LAN complying with the Ethernet® standard. The controller 11, the video recorders 13-1 to 13-N, the server 14, and so forth are interconnected to the network 12.

The network 12 is not limited to the wireless LAN complying with the IEEE 802.11 standard or the LAN complying with the Ethernet® standard, and may be composed of a public switched telephone network (PSTN), such as the Internet, a telephone network, or ISDN (Integrated Services Digital Network), an optical fiber network, such as FDDI (Fiber Distributed Data Interface), a satellite communication network, or a private or public network, such as a wide area network (WAN) or a LAN.

Each of the video recorders 13-1 to 13-N is an exemplary implementation of a recording apparatus according to an embodiment of the present invention, and is a device accessible to the network 12, such as a hard disk recorder, a DVD recorder, a video tape recorder, or a hybrid video recorder in which a hard disk recorder and a DVD recorder are combined.

Each of the video recorders 13-1 to 13-N receives a status request transmitted from the controller 11 via the network 12. Each of the video recorders 13-1 to 13-N transmits a status response to the controller 11 via the network 12 in response to the status request transmitted from the controller 11.

Further, each of the video recorders 13-1 to 13-N receives and sets reservation information transmitted from the controller 11 via the network 12.

The server 14 is a device accessible to the network 12, such as a dedicated server or a personal computer (PC). In response to a request from the controller 11 or one of the video recorders 13-1 to 13-N, the server 14 delivers content encoded using, for example, MPEG2 (Moving Picture Experts Group phase 2) or MPEG4 (Moving Picture Experts Group phase 4) to the controller 11 or the one of the video recorders 13-1 to 13-N.

The video recorders 13-1 to 13-N are hereinafter referred to as a "video recorder 13" unless they need to be distinguished from each other. An arbitrary one of the video recorders 13-1 to 13-N is represented by a video recorder 13-i, 13-j, 13-k, 13-m, or 13-p.

FIG. 2 is a block diagram showing an example structure of the controller 11.

The controller 11 includes a central processor (CPU) 31, an input switch matrix unit 32, a read-only memory (ROM) 33, a random access memory (RAM) 34, a bus 35, a communication unit 36, a codec processor 37, a graphic display processor (GDP) 38, a liquid crystal display (LCD) 39, a data input/output interface 40, a storage device 41, and an infrared communication unit 42. The CPU 31, the ROM 33, the RAM 34, the communication unit 36, the codec processor 37, the GDP 38, the LCD 39, the data input/output interface 40, and the infrared communication unit 42 are interconnected via the bus 35.

The CPU 31 controls the respective components of the controller 11. The CPU 31 executes various processes according to programs stored in the ROM 33. The RAM 34 stores the programs executed by the CPU 31, data, etc., as needed.

The input switch matrix unit 32 includes, for example, a key operation section, such as a ten-key pad, an audio adjustment key, a video-quality adjustment key, or a channel selection key. The input switch matrix unit 32 supplies a predetermined operation signal in accordance with a user's operation to the CPU 31.

The communication unit 36 is composed of a wireless LAN interface complying with the IEEE 802.11 standard, a wired LAN interface complying with the Ethernet® standard, or the like, and mutually communicates with other equipment, such as the video recorder 13, in a wired or wireless manner.

The codec processor 37 performs encoding or decoding processing. For example, the codec processor 37 encodes a video signal obtained by demodulating a broadcast signal corresponding to television broadcast waves fed from the communication unit 36 or a tuner (not shown), such as terrestrial waves or broadcasting satellite (BS) radio waves received by an antenna (not shown), and supplies the resulting encoded audio or image data to the storage device 41 via the data input/output interface 40. Further, for example, the codec processor 37 decodes audio or image data fed from the storage device 41 via the data input/output interface 40, and supplies the decoded image data to the GDP 38 and the decoded audio data to a speaker (not shown) or the like.

The GDP 38 controls the driving of the LCD 39 to display an image on the LCD 39. For example, the GDP 38 displays an image of the image data decoded by the codec processor 37 on the LCD 39.

The data input/output interface 40 is composed of a predetermined interface compatible with the storage device 41, such as a universal serial bus (USB) interface or a memory card interface. For example, when the storage device 41 is a hard disk, the data input/output interface 40 is composed of a predetermined interface compatible with the hard disk.

The storage device 41 is composed of a recording medium, such as a hard disk, a memory card, a recordable DVD, a compact disc (CD) or blu-ray disc (BD), a Mini Disc (MD) (registered trademark), a video home system (VHS) (registered trademark) video tape, a Beta (registered trademark) video tape, or a magnetic tape, and is connected to the data input/output interface 40. For example, the storage device 41 records thereon the encoded audio or video data fed from the codec processor 37 via the data input/output interface 40, or supplies the encoded audio or video data recorded on the storage device 41 to the codec processor 37.

The infrared communication unit 42 generates an infrared command defined by, for example, the SIRCS (Serial Infrared Remote Control System) protocol, and transmits the generated infrared command to other equipment under the control of the CPU 31. The infrared communication unit 42 further receives an infrared command transmitted from other equipment, e.g., an infrared command defined by the SIRCS protocol.

Figure 3:
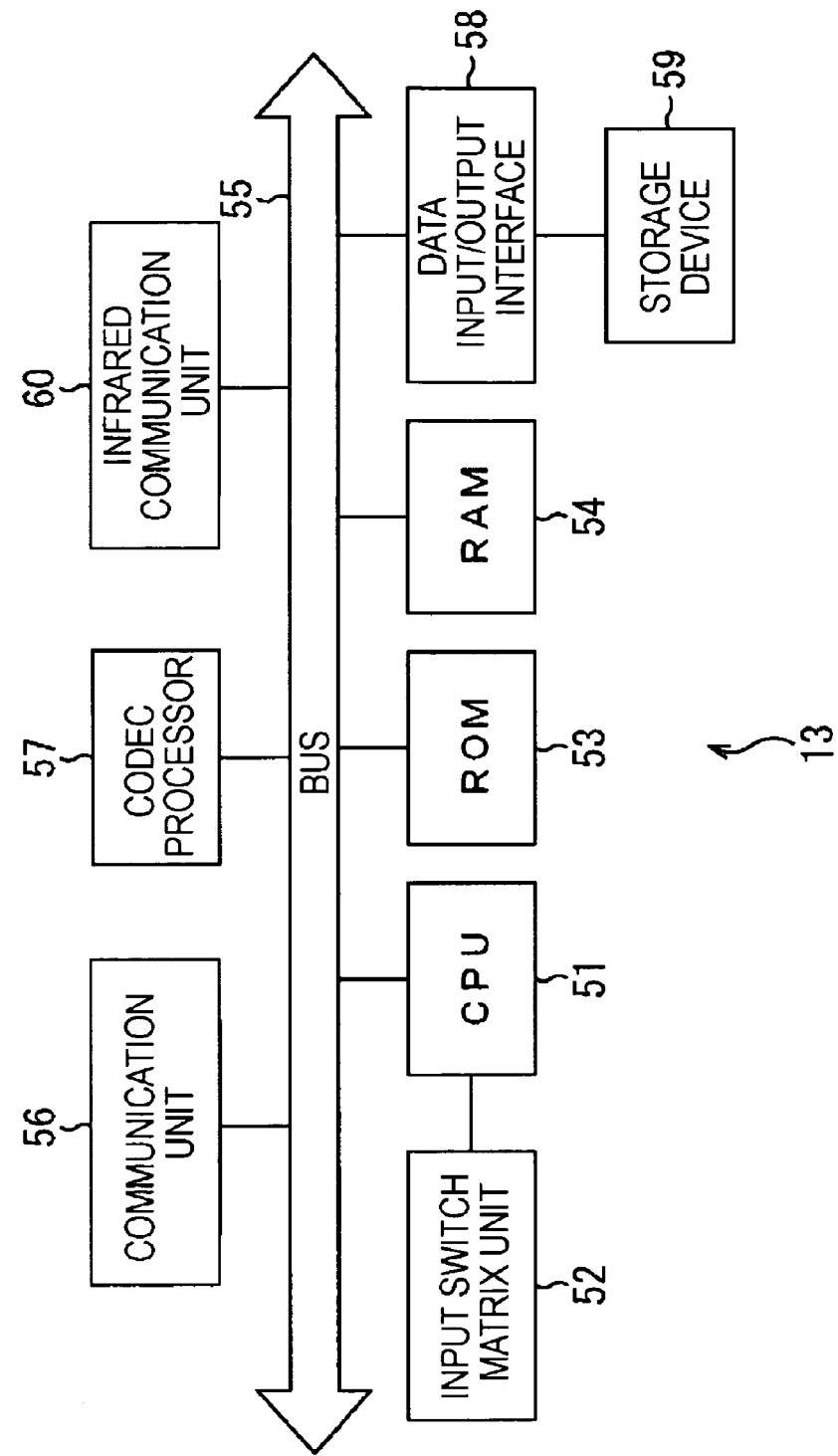
FIG. 3 is a block diagram showing an example structure of a video recorder.

FIG. 3 is a block diagram showing an example structure of the video recorder 13.

The video recorder 13 includes a CPU 51, an input switch matrix unit 52, a ROM 53, a RAM 54, a bus 55, a communication unit 56, a codec processor 57, a data input/output interface 58, a storage device 59, and an infrared communication unit 60. The CPU 51, the ROM 53, the RAM 54, the communication unit 56, the codec processor 57, the data input/output interface 58, and the infrared communication unit 60 are interconnected via the bus 55.

The CPU 51 controls the respective components of the video recorder 13. The CPU 51 executes various processes according to programs stored in the ROM 53. The RAM 54 stores the program executed by the CPU 51, data, etc., as needed.

The input switch matrix unit 52 includes, for example, a key operation section, such as a ten-key pad, an audio adjustment key, a video-quality adjustment key, or a channel selection key. The input switch matrix unit 52 supplies a predetermined operation signal in accordance with a user's operation to the CPU 51.

The communication unit 56 is composed of a wireless LAN interface complying with the IEEE 802.11 standard, a wired LAN interface complying with the Ethernet® standard, or the like, and mutually communicates with other equipment, such as the controller 11, in a wired or wireless manner.

The codec processor 57 performs encoding or decoding processing. For example, the codec processor 57 encodes a video signal obtained by demodulating a broadcast signal corresponding to television broadcast waves fed from the communication unit 56 or a tuner (not shown), such as terrestrial waves or BS radio waves received by an antenna (not shown), and supplies the resulting encoded audio or image data to the storage device 59 via the data input/output interface 58. Further, for example, the codec processor 57 decodes audio or image signal fed from the storage device 59 via the data input/output interface 58, and supplies the decoded image data to a display device (not shown), such as an LCD or a cathode ray tube (CRT) display, and the decoded audio data to a speaker (not shown) or the like.

The data input/output interface 58 is composed of a predetermined interface compatible with the storage device 59, such as a USB or memory card interface. For example, when the storage device 59 is a hard disk, the data input/output interface 58 is composed of a predetermined interface compatible with the hard disk.

The storage device 59 is composed of a recording medium, such as a hard disk, a memory card, a recordable DVD, a CD or BD, an MD (registered trademark), a VHS (registered trademark) video tape, a Beta (registered trademark) video tape, or a magnetic tape, and is connected to the data input/output interface 58. For example, the storage device 59 records thereon the encoded audio or video data fed from the codec processor 57 via the data input/output interface 58, or supplies the encoded audio or video data recorded on the storage device 59 to the codec processor 57.

The infrared communication unit 60 generates an infrared command defined by, for example, the SIRCS protocol, and transmits the generated infrared command to other equipment under the control of the CPU 51. The infrared communication unit 60 further receives an infrared command transmitted from other equipment, e.g., an infrared command defined by the SIRCS protocol.

The video recorder 13 may have a similar structure to that shown in FIG. 2.

Figure 4:
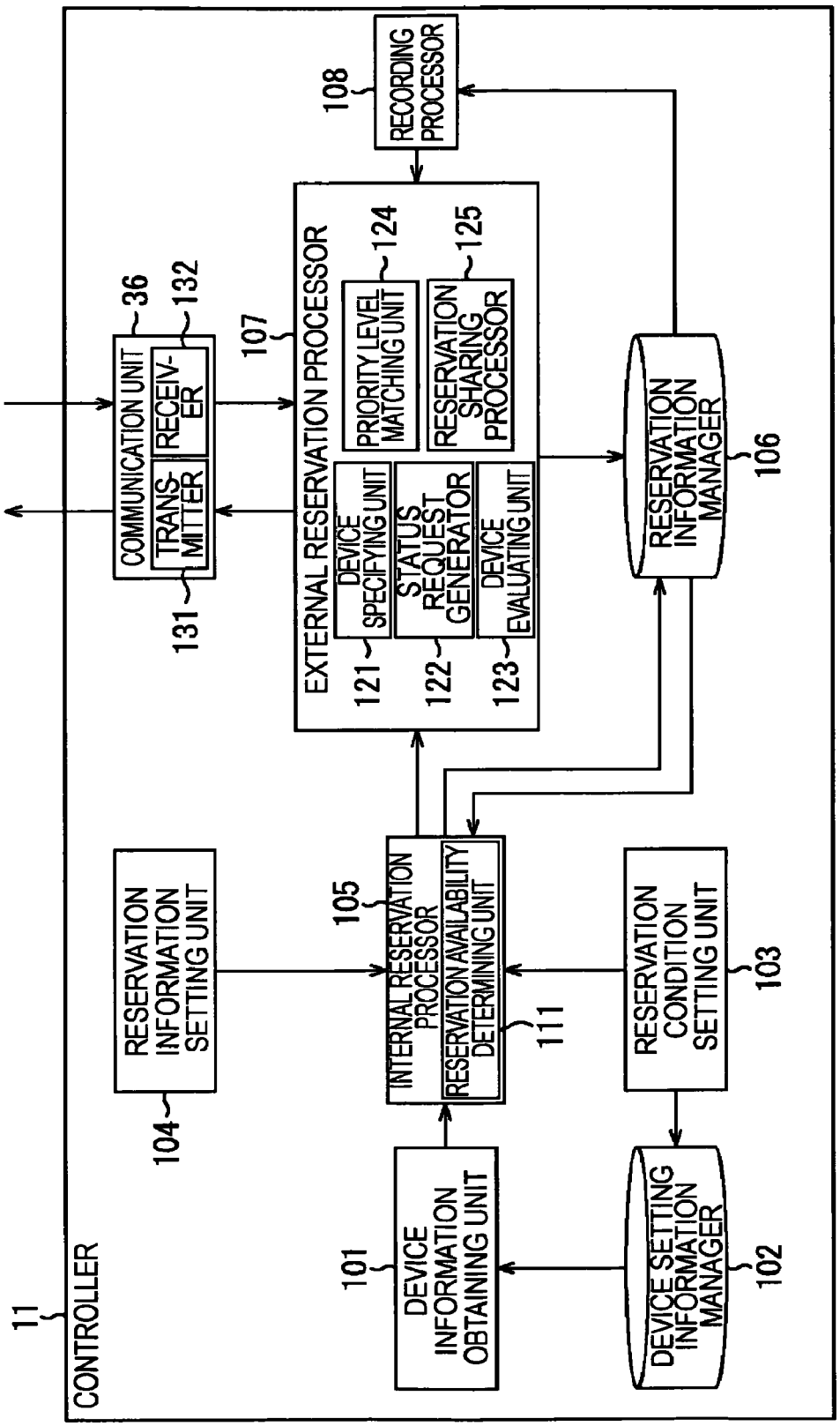
FIG. 4 is a block diagram showing an example structure of functions of the controller.

FIG. 4 is a block diagram showing an example structure of functions of the controller 11.

The controller 11 includes a communication unit 36, a device information obtaining unit 101, a device setting information manager 102, a reservation condition setting unit 103, a reservation information setting unit 104, an internal reservation processor 105, a reservation information manager 106, and an external reservation processor 107.

The device information obtaining unit 101 retrieves device information and setting information (device setting information) recorded on the device setting information manager 102 according to a user's operation of the input switch matrix unit 32, and supplies the retrieved device setting information to the internal reservation processor 105.

The device information, as described in detail below, is information regarding a device, such as the tuner name, the external connected device name, the storage device name, the codec format, the recording-quality mode, the remaining recoding time, the reservation setting information, or the simultaneous reservation availability information, described above. The setting information, as described in detail below, is information regarding device settings set by the user, such as device installation information regarding an installation location of a device, a group name indicating information regarding a device group registered by the user, or individual specification information regarding individual devices specified by the user. The device information and the setting information are generally referred to as "device setting information".

The internal reservation processor 105 displays a reservation-device selection condition setting view for allowing the user to set reservation information and reservation conditions on the screen of the LCD 39 based on the device setting information supplied from the device information obtaining unit 101.

The reservation condition setting unit 103 accepts a selection of reservation conditions according to a user's operation of the input switch matrix unit 32. The reservation condition setting unit 103 supplies the selected reservation conditions to the internal reservation processor 105. The reservation condition setting unit 103 also supplies the reservation conditions selected by the user's operation of the input switch matrix unit 32 to the device setting information manager 102 to record the selected reservation conditions on the device setting information manager 102.

The reservation conditions are conditions under which a device to be set to record a broadcast program is specified. The reservation conditions include information, such as a storage device name, a group name, device installation information, and individual specification information.

The reservation information setting unit 104 accepts a selection (input) of reservation information according to a user's operation of the input switch matrix unit 32. The reservation information setting unit 104 supplies the selected reservation information to the internal reservation processor 105.

The internal reservation processor 105 includes a reservation availability determining unit 111.

The reservation availability determining unit 111 determiners whether or not the recording is settable in the controller 11 on the basis of the reservation information supplied from the reservation information setting unit 104. If the reservation availability determining unit 111 determines that the recording is settable, the internal reservation processor 105 supplies and records the reservation information on the reservation information manager 106 to set a recording reservation. If the reservation availability determining unit 111 determines that the recording is not settable, the internal reservation processor 105 supplies the reservation conditions and the reservation information to the external reservation processor 107.

The external reservation processor 107 performs a controlled-device reservation setting process for setting a recording reservation in a device other than the controller 11 on the basis of the reservation conditions and reservation information supplied from the internal reservation processor 105.

The external reservation processor 107 includes a device specifying unit 121, a status request generator 122, a device evaluating unit 123, a priority level matching unit 124, and a reservation sharing processor 125.

The device specifying unit 121 specifies (selects) a device that is set to perform recording on the basis of the reservation conditions supplied from the internal reservation processor 105.

The status request generator 122 generates a status request for the status of the device specified by the device specifying unit 121 based on the reservation conditions and reservation information supplied from the internal reservation processor 105. The status request generator 122 supplies the generated status request to the communication unit 36.

The communication unit 36 corresponds to the communication unit 36 shown in FIG. 2, and communicates with, for example, the video recorder 13 via the network 12.

The communication unit 36 includes a transmitter 131 that transmits various data, and a receiver 132 that receives various data. The transmitter 131 transmits the status request supplied from the external reservation processor 107 to the video recorder 13 via the network 12. The receiver 132 receives a status response transmitted from the video recorder 13 via the network 12, and supplies the received status response to the external reservation processor 107.

The device evaluating unit 123 performs a controlled-device evaluation process for evaluating a priority level of the controlled device on the basis of the status response supplied from the communication unit 36. The device evaluating unit 123 supplies the result (priority level) obtained by the controlled-device evaluation process to the priority level matching unit 124.

The priority level matching unit 124 specifies (selects) a device to which the reservation information is transmitted according to the priority levels supplied from the device evaluating unit 123, and supplies the reservation information to be transmitted to the specified device to the communication unit 36. The transmitter 131 transmits the reservation information supplied from the external reservation processor 107 to the device specified by the priority level matching unit 124 via the network 12.

Based on the priority levels supplied from the device evaluating unit 123, if the recording reservation is shared between devices, the reservation sharing processor 125 performs a reservation sharing process for setting recording reservations on a plurality of devices.

A recording processor 108 determines whether or not the controller 11 is able to perform the recording at a time a predetermined time before a set recording start time of the broadcast program. If it is determined that the controller 11 is able to perform the recording, the recording processor 108 starts the recording of the broadcast program according to the reservation information retrieved from the reservation information manager 106. If it is determined that the controller 11 is not able to perform the recording, the recording processor 108 supplies the reservation information to the external reservation processor 107.

Figure 5:
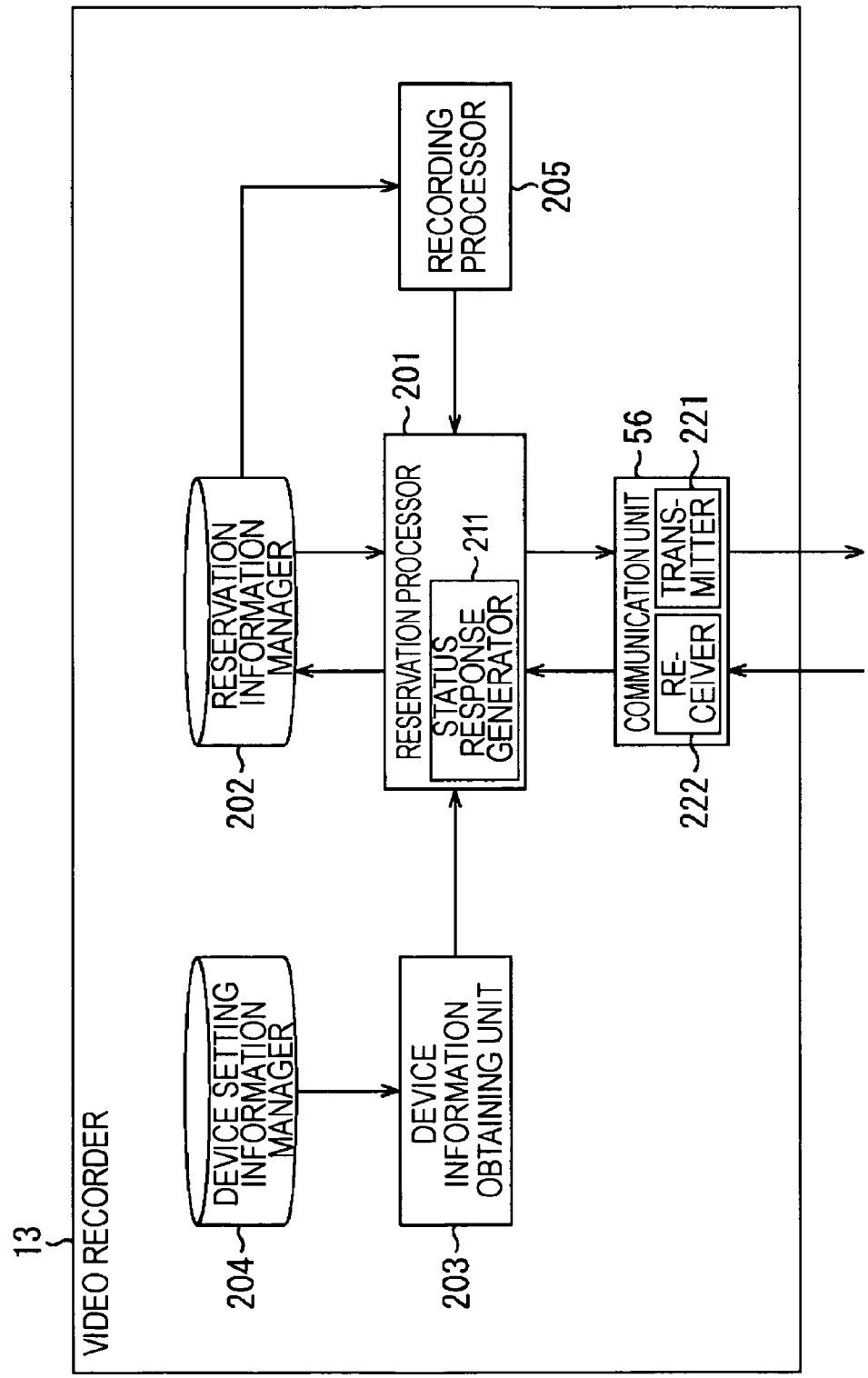
FIG. 5 is a block diagram showing an example structure of functions of the video recorder.

FIG. 5 is a block diagram showing an example structure of functions of the video recorder 13.

The video recorder 13 includes a communication unit 56, a reservation processor 201, a reservation information manager 202, a device information obtaining unit 203, and a device setting information manager 204.

The communication unit 56 corresponds to the communication unit 56 shown in FIG. 3, and communicates with, for example, the controller 11 via the network 12.

The communication unit 56 includes a transmitter 221 that transmits various data and a receiver 222 that receives various data. The receiver 222 receives a status request transmitted from the controller 11 via the network 12, and supplies the received status request to the reservation processor 201.

The reservation processor 201 includes a status response generator 211.

The status response generator 211 generates a status response to the status request supplied from the communication unit 56. The status response generator 211 supplies the generated status response to the communication unit 56.

The status response generator 211 generates a status response based on, for example, the information obtained by the device information obtaining unit 203 from the device setting information manager 204 and supplied from the device information obtaining unit 203 and the reservation information obtained from the reservation information manager 202, and supplies the generated status response to the communication unit 56. The transmitter 221 transmits the status response supplied from the reservation processor 201 to the controller 11 via the network 12.

The receiver 222 receives reservation information transmitted from the controller 11 via the network 12, and supplies the received reservation information to the reservation processor 201. The reservation processor 201 records the reservation information supplied from the communication unit 56 on the reservation information manager 202 to set a recording reservation.

A recording processor 205 determines whether or not the video recorder 13 is able to perform the recording at a predetermined time. If it is determined that the video recorder 13 is able to perform the recording, the recording processor 205 starts the recording of the broadcast program according to the reservation information retrieved from the reservation information manager 202. If it is determined that the video recorder 13 is not able to perform the recording, the recording processor 205 supplies a notification that reservation of the recording is unavailable (hereinafter referred to as a "reservation-unavailability notification") to the communication unit 56. The transmitter 221 transmits the reservation-unavailability notification supplied from the reservation processor 201 to the controller 11 via the network 12.

A reservation setting process for setting reservation of recording of a broadcast program and a video recording process for recording the broadcast program based on the set reservation will be described with reference to FIGS. 6 to 20, by way of example of processes of the video recording reservation system 1 according to an embodiment of the present invention.

A reservation setting process for setting reservation of recording of a broadcast program will now be described with reference to FIGS. 6 to 16. The details of the reservation setting process performed by the controller 11 will be first described with reference to FIGS. 6 to 15, and the details of the reservation setting process performed by the video recorder 13 will then be described with reference to FIG. 16.

FIG. 6 is a flowchart showing a reservation setting process by the controller 11.

In step S11, the internal reservation processor 105 displays a reservation-device selection condition setting view for allowing the user to set reservation information and reservation conditions on the screen of the LCD 39 according to a user's operation.

For example, the device information obtaining unit 101 retrieves device information and setting information (device setting information) recorded on the device setting information manager 102 according to a user's operation, and supplies the retrieved device setting information to the internal reservation processor 105. The internal reservation processor 105 displays a reservation-device selection condition setting view on the screen of the LCD 39 based on the device setting information supplied from the device information obtaining unit 101.

FIG. 7 illustrates an example of the device setting information recorded on the device setting information manager 102.

In the example of the device setting information shown in FIG. 7, the first column includes conditions under which a device that is set to record a broadcast program is selected, and the second column includes condition parameters corresponding to the conditions included in the first column. The third column includes examples (specific values) of the condition parameters included in the second column. The fourth column includes priority applicability indicating whether or not priorities are applicable in each condition having a plurality of condition parameters. The fifth column includes remarks reserved for supplementary comments on the conditions included in the first column.

The first row includes titles, and the subsequent rows include data of the conditions. In the data of the conditions included in the second to twelfth rows, the second to eighth rows include conditions regarding device information, and the ninth to eleventh rows include conditions regarding setting information.

In the example shown in FIG. 7, the condition in the first column from the leftmost and the second row from the top, namely, "available tuner", has the condition parameter, namely, "tuner name", e.g., "terrestrial analog", "terrestrial digital", "BS analog", "BS digital", "Casper Television", and "Casper Television 110", and no priorities are applicable in the condition parameter.

The condition in the first column from the leftmost and the third row from the top, namely, "external input", has the condition parameter, namely, "external connected device name", e.g., "living room hard disk recorder", and no priorities are applicable in the condition parameter.

The condition in the first column from the leftmost and the fourth row from the top, namely, "available storage device", has the condition parameter, namely, "storage device name", e.g., "hard disk", "memory card", "DVD", "VHS", "Beta", "CD", "MD", and "tape", and priorities are applicable in the condition parameter.

The condition in the first column from the leftmost and the fifth row from the top, namely, "compatible recording format", has the condition parameter, namely, "codec format", e.g., "MPEG2", "MPEG4", and "MP3", and data of the condition parameter, namely, "recording-quality mode", e.g., "high quality" and "long time", and priorities are applicable in the condition parameters.

The condition in the first column from the leftmost and the sixth row from the top, namely, "available recording time", has the condition parameter, namely, "remaining recording time", indicating the remaining recording time of the available storage device, and no priorities are applicable in the condition parameter.

The condition in the first column from the leftmost and the seventh row from the top, namely, "reservation status in reservation time zone", has the condition parameter, namely, "reservation setting information", indicating recording reservations scheduled in reservation time zones, and no priorities are applicable in the condition parameter.

The condition in the first column from the leftmost and the eighth row from the top, namely, "reservation availability in the same time zone", has the condition parameter, namely, "simultaneous reservation availability information", indicating availability of a reservation in the same time zone as the set reservation, and no priorities are applicable in the condition parameter.

The condition in the first column from the leftmost and the ninth row from the top, namely, "device's installation location", has data of the condition parameter, namely, "device installation information", indicating information regarding installation locations of devices, e.g., "living room", "kitchen", and "study room", and priorities are applicable in the condition parameter.

The condition in the first column from the leftmost and the tenth row from the top, namely, "user's registered device group", has the condition parameter, namely, "group name", indicating information regarding a device group registered by the user, e.g., "father's devices" and "living room devices", and priorities are applicable in the condition parameter.

The condition in the first column from the leftmost and the 11th row from the top, namely, "user's registered target device", has the condition parameter, namely, "individual specification information", indicating information regarding individual devices specified by the user, e.g., "living room hard disk recorder", "living room PC", "bedroom hard disk recorder", "study room PC", "living room TV", and "living room amp", and priorities are applicable in the condition parameter.

The condition in the first column from the leftmost and the 12th row from the top, namely, "priority applicability", has priorities in the condition parameter of the condition that is "applicable" in the "priority applicability" field in the fourth column in the device setting information shown in FIG. 7. Thus, the "priority applicability" condition has priorities assigned in the condition parameter of the condition that is "applicable" in the "priority applicability" field in the fourth column in the device setting information shown in FIG. 7, e.g., "1: hard disk", "2: memory card", and "3: DVD".

The condition parameters in which priorities are assigned may include not only the "storage device name", described above, but also other condition parameters corresponding to conditions that are "available" in the "priority applicability" field in the fourth column, i.e., "codec format", "recording-quality mode", "device installation information", "group name", and "individual specification information".

The conditions of the device setting information shown in FIG. 7 are merely examples, and other information regarding devices or information regarding device settings may be set as conditions. The device setting information manager 102 may store the device setting information in the form of a table.

Referring back to the flowchart of FIG. 6, in step S11, for example, the device information obtaining unit 101 retrieves the device setting information (see FIG. 7) recorded on the device setting information manager 102 according to a user's operation, and supplies the retrieved device setting information to the internal reservation processor 105. The internal reservation processor 105 displays a reservation-device selection condition setting view on the screen of the LCD 39 based on the device setting information (see FIG. 7) supplied from the device information obtaining unit 101.

FIG. 8 illustrates an exemplary reservation-device selection condition setting view displayed on the screen of the LCD 39.

In the example shown in FIG. 8, the reservation-device selection condition setting view includes a channel selector 301, a reservation-time selector 302, a recording-quality selector 303, a recording-format selector 304, a priority selector 305, a storage-device selector 306, and a target-device selector 307.

In the example shown in FIG. 8, the channel selector 301 is displayed on the right to a "channel" field to allow the user to select a tuner and a channel that can be selected by the tuner.

For example, the channel selector 301, when operated by the user, provides the tuner names set as the condition parameter "tuner name" in the device setting information (see FIG. 7), namely, "terrestrial analog broadcast", "terrestrial digital broadcast", "BS analog broadcast", "BS digital broadcast", "Casper Television", and "Casper Television 110". For example, when the tuner for tuning the broadcast program to be recorded is a BS digital broadcast tuner, the user operates the channel selector 301, and selects the tuner name "BS digital broadcast" from the tuner names "terrestrial analog broadcast", "terrestrial digital broadcast", "BS analog broadcast", "BS digital broadcast", "Casper Television", and "Casper Television 110".

The channel selector 301, when operated by the user, further provides channels that can be selected by a selection the channel selector 301 to allow the user to select a channel. When a channel is selected using the channel selector 301, the channel name of the selected channel is provided in the right side of the channel selector 301. For example, when the user operates the channel selector 301 and selects channel 105, the channel name of channel 105, namely, "MHK BS Hi-Vision", is provided on the right side of the channel selector 301.

In the example shown in FIG. 8, the reservation-time selector 302 is displayed on the right to a "reservation time" field to select reservation time.

For example, the reservation-time selector 302, when operated by the user, provides numbers representing time to select reservation start time and reservation end time. For example, when the broadcast program to be recorded is broadcasted from 20:00 to 20:59, the user operates the reservation-time selector 302, and inputs the reservation start time, which is "20:00", and the reservation end time, which is "20:59".

The method for inputting the reservation time is not limited thereto. The reservation time may be input by any other method, such as by directly inputting the reservation time using keys (not shown) provided for the controller 11 or by selecting a desired broadcast program.

In the example shown in FIG. 8, the recording-quality selector 303 is displayed on the right to a "recording quality" field to allow the user to set a recording-quality mode. Further, the recording-format selector 304 is displayed below the recording-quality selector 303 to specify a recording format, and the priority selector 305 is displayed below the recording-format selector 304 to specify the priority of the recording-quality mode and the recording format.

For example, the recording-quality selector 303, when operated by the user, provides the recording-quality modes set as the condition parameter "recording-quality mode" in the device setting information (see FIG. 7), namely, "high quality" and "long time", and a "priority-based" option for specifying the recording-quality mode according to the priorities assigned to the "high quality" and "long time" condition parameters. For example, when the user desires to specify the recording-quality mode according to the priority, the user operates the recording-quality selector 303, and selects the recording-quality mode "priority-based" from the recording-quality modes "high quality", "long time", and "priority-based".

For example, the recording-format selector 304, when operated by the user, provides the codec formats set as the condition parameter "codec format" in the device setting information (see FIG. 7), namely, "MPEG2" and "MPEG4", and a "priority-based" option for specifying the codec format according to the priorities assigned to the "MPEG2" and "MPEG4" condition parameters. For example, when the user desires to specify "MPEG2", the user operates the recording-format selector 304, and selects the codec format "MPEG2" from the codec formats "MPEG2", "MPEG4", and "priority-based".

The user may click a radio button for selecting either a "specify quality" or "specify recording format" option to select one of them, and may specify a device designated by the selected option.

The priority selector 305 allows the user to select the priority from the recording-quality mode selected in the recording-quality selector 303 and the codec format selected in the recording-format selector 304 according to a user's operation.

For example, the priority selector 305 allows the user to assign priorities to the recording-quality modes set as the condition parameter "recording-quality mode" in the device setting information (see FIG. 7), namely, "high quality" and "long time". When higher priority is to be assigned to the high-quality recording mode than the long-time video recording mode, the user selects "high quality" as the recording-quality mode with priority level "1" (the first-priority recording-quality mode) and "long time" as the recording-quality mode with priority level "2" (the second-priority recording-quality mode).

For example, the priority selector 305 further allows the user to assign priorities to the codec formats set as the condition parameter "codec format" in the device setting information (see FIG. 7), namely, "MPEG2" and "MPEG4". When higher priority is to be assigned to the "MPEG2" codec format than the "MPEG4" codec format, the user selects "MPEG2" as the codec format with priority level "1" (the first-priority codec format) and "MPEG4" as the codec format with priority level "2" (the second-priority codec format).

Thus, when the "priority-based" option is selected in each of the recording-quality selector 303 and the recording-format selector 304, the priority selected in the priority selector 305 is based to specify a target device (the video recorder 13) according to the selected priority levels.

In the example shown in FIG. 8, the storage-device selector 306 is displayed on the right to a "target storage device" field to allow the user to select an available storage device.

For example, the storage-device selector 306, when operated by the user, provides the storage device names set as the condition parameter "storage device name" in the device setting information (see FIG. 7), namely, "hard disk", "memory card", "DVD", "VHS", "Beta", "CD", "MD", and "tape". For example, when the user desires to record the desired broadcast program onto a hard disk, the user operates the storage-device selector 306, and selects the storage device name "hard disk" from the storage device names "hard disk", "memory card", "DVD", "VHS", "Beta", "CD", "MD" and "tape".

In the example shown in FIG. 8, the target-device selector 307 is displayed on the right to a "target device" field to allow the user to select a target device.

The target-device selector 307 includes, for example, "all devices" indicating that all devices are targeted, "group" indicating that only devices in a group specified by the user are targeted, "specify location" indicating that only the devices installed in a location specified by the user are targeted, and "specify device" indicating that only the devices specified by the user are targeted.

For example, the target-device selector 307 allows the user to click a radio button for selecting one of the "all devices", "group", "specify location", and "specify device" options to specify a target device according to the selected option. The target-device selector 307 may allow the user to select one or a plurality of desired options from these options by, for example, using checkboxes or the like to specify a target device under multiple conditions.

For example, when the user desires to specify a target device from all devices connected to the network 12, the user operates the target-device selector 307, and selects the "all devices" option from the "all devices", "group", "specify location", and "specify device" options.

For example, when the user desires to specify a target device from devices belonging to a group, the user operates the target-device selector 307, and selects the "group" option from the "all devices", "group", "specify location", and "specify device" options. For example, the target-device selector 307 provides the group names set as the condition parameter "group name" in the device setting information (see FIG. 7), namely, "father's devices" and "living room devices". When the user desires to specify a device in the group of father's devices, the user operates the target-device selector 307, and selects the group name "father's devices" from the group names "father's devices" and "living room devices".

For example, when the user desires to specify a target device from devices installed in a specific location, the user operates the target-device selector 307, and selects the "specify location" option from the "all devices", "group", "specify location", and "specify device" options. For example, the target-device selector 307 provides the device setting information set as the condition parameter "device installation information" in the device setting information (see FIG. 7), namely, "living room", "kitchen", and "study room". When the user desires to specify a device on basis of the installation location "living room", the user operates the target-device selector 307, and selects the device setting information "living room" from the device setting information "living room", "kitchen", and "study room".

For example, when the user desires to individually specify a target device, the user operates the target-device selector 307, and selects the "specify device" option from the "all devices", "group", "specify location", and "specify device" options. For example, the target-device selector 307 provides the individual specification information set as the condition parameter "individual specification information" in the device setting information (see FIG. 7), namely, "living room hard disk recorder", "living room PC", "bedroom hard disk recorder", "study room PC", "living room TV", and "living room amp". When the user desires to specify a device on the basis of the individual specification information "living room hard disk recorder", "living room PC", "bedroom hard disk recorder", and "study room PC", the user operates the target-device selector 307, and selects the individual specification information "living room hard disk recorder", "living room PC", "bedroom hard disk recorder", and "study room PC" from the individual specification information "living room hard disk recorder", "living room PC", "bedroom hard disk recorder", "study room PC", "living room TV", and "living room amp".

The illustrated reservation-device selection condition setting view is merely an example, and any view that allows the user to make a selection of the condition parameters of the device setting information (see FIG. 7) may be used. While the illustrated reservation-device selection condition setting view is a view for setting reservation of recording of a television program, for example, a view for allowing the user to record audio content from radio broadcasts or the like may be used. In this case, for example, the "channel" field is replaced by a "radio broadcast" field, and the "specify recording format" option is replaced by an "audio codec switching" option or the like.

Referring back to the flowchart of FIG. 6, in step S12, the reservation condition setting unit 103 accepts a selection of reservation conditions according to a user's operation. The reservation condition setting unit 103 supplies the selected reservation conditions to the internal reservation processor 105.

In step S12, for example, the reservation condition setting unit 103 accepts a selection of the storage device name "hard disk" selected in the storage-device selector 306 on the reservation-device selection condition setting view (see FIG. 7) according to a user's operation, and further accepts a selection of the group name "father's devices" selected in the target-device selector 307. The reservation condition setting unit 103 supplies the selected information, i.e., "hard disk" and "father's devices", to the internal reservation processor 105.

The group with the group name "father's devices" has devices, which are video recorders 13-*i* and 13-*j*, registered therein, and, as described above, priorities are applicable to the devices in the group. The video recorder 13-*i* is assigned first priority, and the video recorder 13-*j* is assigned second priority. Each of the video recorders 13-*i* and 13-*j* includes a hard disk as the storage device 59.

For ease of illustration, the group with the group name "father's devices" further has video recorders 13-*k*, 13-*m*, and 13-*p* registered therein, if necessary.

In step S13, the reservation information setting unit 104 accepts a selection (input) of reservation information according to a user's operation. The reservation information setting unit 104 supplies the selected reservation information to the internal reservation processor 105.

In step S13, for example, the reservation information setting unit 104 accepts a selection of the tuner name "BS digital broadcast, channel 105" selected in the channel selector 301, the reservation time "20:00 to 20:59" selected in the reservation-time selector 302, the recording-quality mode "priority-based" selected in the recording-quality selector 303, and the first priority assigned to "high quality" and the second priority assigned to "long time" selected in the priority selector 305 on the reservation-device selection condition setting view (see FIG. 7) according to a user's operation. The reservation information setting unit 104 supplies the selected information, i.e., the tuner name "BS digital broadcast, channel 105", the reservation time "20:00 to 20:59", the recording-quality mode "priority-based", the first priority assigned to "high quality", and the second priority assigned to "long time", to the internal reservation processor 105.

In step S14, the reservation availability determining unit 111 determines whether or not the recording is settable in the controller 11 on the basis of the reservation information supplied from the reservation information setting unit 104.

For example, the reservation availability determining unit 111 retrieves its reservation information recorded on the reservation information manager 106, and compares the retrieved reservation information with the reservation information supplied from the reservation information setting unit 104 to determine whether or not the recording is not settable by determining whether or not another recording reservation has been scheduled in the same time zone as the reservation time, namely, "20:00 to 20:59", by determining whether or not the channel, namely, "BS digital broadcast, channel 105", is receivable on an available tuner of the controller 11, or by determining whether or not the capacity of the storage device 41 is sufficient for the recording in the first-priority recording mode, namely, "high quality", or the second-priority recording mode, namely, "long time".

If it is determined in step S14 that the recording is settable, then, in step S15, the internal reservation processor 105 records the reservation information on the reservation information manager 106 to set a recording reservation.

When it is determined that the recording is settable, for example, the internal reservation processor 105 supplies reservation information including the tuner name "BS digital broadcast, channel 105", the reservation time "20:00 to 20:59", the recording-quality mode "priority-based", the first priority assigned to "high quality", and the second priority assigned to "long time" to the reservation information manager 106. The reservation information manager 106 records the reservation information supplied from the internal reservation processor 105, i.e., the tuner name "BS digital broadcast, channel 105", the reservation time "20:00 to 20:59", the recording-quality mode "priority-based", the first priority assigned to "high quality", and the second priority assigned to "long time", thereby setting a recording reservation in the controller 11.

In step S16, the reservation availability determining unit 111 determines whether or not a plurality of recording reservations are to be set. If a plurality of recording reservations are not to be set, for example, when the user does not request a plurality of recording reservations, no more recording reservations are set. Then, the process ends.

If it is determined in step S16 that a plurality of recording reservations are to be set, the process returns to step S14, and the processing described above is repeatedly performed. For example, when the user requests a plurality of recording reservations, the processing of steps S14 to S17 is repeatedly processed to set a recording reservation in either the controller 11 or the video recorder 13 until the reservations requested by the user have been set.

If it is determined in step S14 that the recording is not settable, then, in step S17, the external reservation processor 107 performs a controlled-device reservation setting process for setting a recording reservation in a device other than the controller 11. Then, the process ends.

When it is determined that the recording is not settable, for example, the internal reservation processor 105 supplies the reservation conditions and the reservation information to the external reservation processor 107. The external reservation processor 107 performs the controlled-device reservation setting process on the basis of the reservation conditions and reservation information supplied from the internal reservation processor 105. The details of the controlled-device reservation setting process are described below.

Accordingly, the controller 11 specifies a device satisfying the conditions via the network 12, and sets a recording reservation in the specified device. Therefore, a system efficiently utilizing existing home equipment can be established.

Further, the controller 11 specifies a video recorder 13 satisfying the conditions set by the user via the network 12, and sets reservation information in the specified video recorder 13. Therefore, the recording reservations on a plurality of video recorders 13 can be centrally managed by the controller 11, and can easily be implemented.

Further, since the user presets reservation conditions, the devices located in a specific room can be specified to set a recording reservation, or a target device can be limited on the basis of a storage device such that a recording reservation can be set only in a hard disk recorder. Therefore, the range of target devices can be narrowed down depending on the use.

The details of the controlled-device reservation setting process in step S17 shown in FIG. 6 will be described with reference to a flowchart shown in FIG. 9.

In step S31, the device specifying unit 121 specifies a device that is set to perform recording on the basis of the reservation conditions supplied from the internal reservation processor 105.

In step S31, for example, the device specifying unit 121 refers to the storage device name and group name supplied from the internal reservation processor 105, namely, "hard disk" and "father's devices", and specifies the video recorders 13-*i* and 13-*j* that belong to the group with "father's devices" and that are equipped with the storage devices, which are hard disks.

In step S32, the status request generator 122 generates a status request for the status of the specified device. The status request generator 122 supplies the generated status request to the communication unit 36.

FIG. 10 illustrates an exemplary status request.

In the example shown in FIG. 10, the first row includes titles, and the subsequent rows indicates request fields for some of the functions of the specified device.

The field in the second row from the top, namely, "tuner name", is a request field for obtaining information of a tuner available on the specified device. The field in the third row from the top, namely, "external connected device name", is a request field for obtaining information of a device that can be connected to an external input of the specified device. The field in the fourth row from the top, namely, "storage device name", is a request field for obtaining a storage device available on the specified device.

The field in the fifth row from the top, namely, "codec format", is a request field for obtaining a codec format available to the specified device. The field in the sixth row from the top, namely, "recording-quality mode", is a request field for obtaining a recording-quality mode compatible with the specified device. The field in the seventh row from the top, namely, "remaining recording time", is a request field for obtaining recording time available on the available storage device. The field in the eighth row from the top, namely, "reservation setting information", is a request field for obtaining the status of a recording reservation scheduled in a reservation time zone registered on the specified device. The field in the ninth row from the top, namely, "simultaneous reservation availability information", is a request field for obtaining availability of recording reservations in the same time zone on the specified device.

Figure 9:
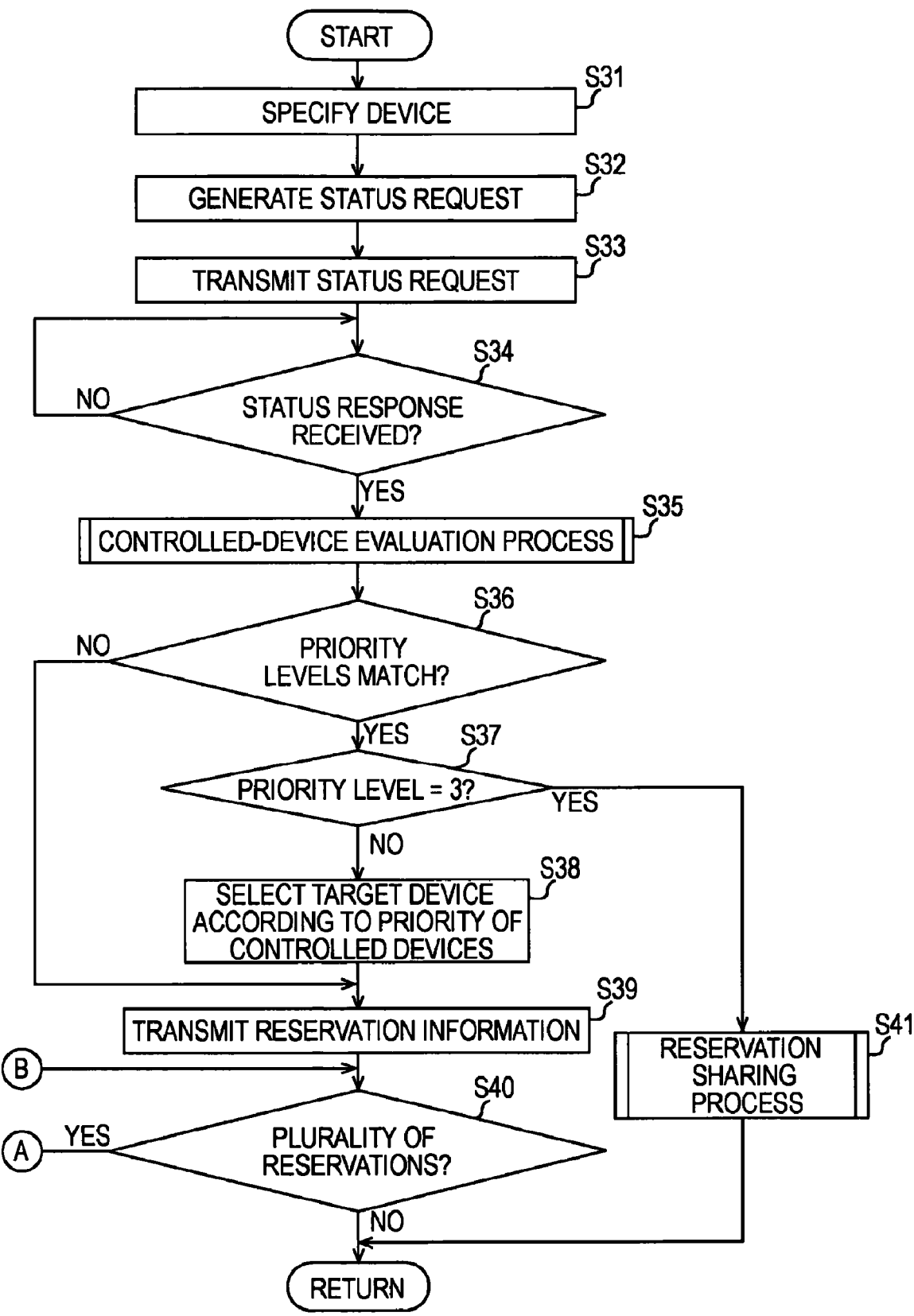
FIG. 9 is a flowchart showing the details of a controlled-device reservation setting process.

Referring back to the flowchart of FIG. 9, in step S32, for example, the status request generator 122 generates the status request shown in FIG. 10 to be transmitted to each of the video recorders 13-*i* and 13-*j*, and supplies the generated status requests to the communication unit 36.

In step S33, the communication unit 36 transmits the status request supplied from the status request generator 122 to the specified device via the network 12. In step S33, for example, the communication unit 36 transmits the status request shown in FIG. 10 supplied from the status request generator 122 to each of the video recorders 13-*i* and 13-*j* via the network 12.

In step S34, the external reservation processor 107 determines whether or not a status response has been received on the basis of a status response that is transmitted from the specified device and that is supplied from the communication unit 36.

In step S34, for example, the external reservation processor 107 determines whether or not a status response has been received on the basis of a status response that is transmitted from the video recorder 13-*i* and that is supplied from the communication unit 36.

If it is determined in step S34 that no status response has been received, the process returns to step S34, and the processing described above is repeatedly performed. That is, the controller 11 stands by until a status response has been received from the device to which the status request has been transmitted via the network 12.

If it is determined in step S34 that a status response has been received, then, in step S35, the device evaluating unit 123 performs a controlled-device evaluation process on the basis of the status response supplied from the communication unit 36. The device evaluating unit 123 supplies the result (priority level) obtained by the controlled-device evaluation process to the priority level matching unit 124. The details of the controlled-device evaluation process are described below.

FIG. 11 illustrates an exemplary status response.

In the example shown in FIG. 11, the first row includes titles, and the subsequent rows indicate response fields to the status request shown in FIG. 10. The fields in the first column correspond to those requested in the status request shown in FIG. 10.

The tuner name in the second column and the second row from the top, namely, "BS digital broadcast", indicates that the tuner available on the specified device is a BS digital broadcast tuner. The external connected device name in the second column and the third row from the top, namely, "child's room hard disk recorder", indicates that the device that can be connected to an external input of the specified device is the hard disk recorder installed in the child's room. The storage device name in the second column and the fourth row from the top, namely, "hard disk", indicates that the storage device available on the specified device is a hard disk.

The codec format in the second column and the fifth row from the top, namely, "MPEG2", indicates that the codec format available to the specified device is MPEG2. The recording-quality mode in the second column and the sixth row from the top, namely, "high quality/long time", indicates that the high-quality recording mode and the long-time recording mode are compatible with the specified device. The remaining recording time in the second column and the seventh row from the top, namely, "high quality: 1 hr/long time: 2 hr", indicates that the specified device provides one-hour recording in the high-quality recording mode and two-hour recording in the long-time recording mode.

The reservation setting information in the second column and the eighth row from the top, namely, "21:00 to 22:00", indicates that a reservation schedule in the time zone from 21:00 to 22:00 has been registered on the specified device. The simultaneous reservation availability information in the second column and the ninth row from the top, namely, "no", indicates that the specified device is not able to set recording reservations in the same time zone.

Referring back to the flowchart of FIG. 9, in step S35, for example, the device evaluating unit 123 evaluates the video recorder 13-*i* on the basis of the status response shown in FIG. 11 that is transmitted from the video recorder 13-*i* and that is supplied from the communication unit 36. The device evaluating unit 123 supplies priority level "1" assigned to the video recorder 13-*i* as a result of the evaluation to the priority level matching unit 124.

For example, the device evaluating unit 123 further evaluates the video recorder 13-*j* on the basis of the status response that is transmitted from the video recorder 13-*j* and that is supplied from the communication unit 36. The device evaluating unit 123 supplies priority level "2" assigned to the video recorder 13-*j* as a result of the evaluation to the priority level matching unit 124.

For example, the device evaluating unit 123 further evaluates the video recorders 13-*k* and 13-*m* on the basis of the status responses that are transmitted from the video recorders 13-*k* and 13-*m* and that are supplied from the communication unit 36. The device evaluating unit 123 supplies priority level "3" assigned to the video recorder 13-*k* and priority level "3" assigned to the video recorder 13-*m* as results of the evaluation to the priority level matching unit 124.

In step S36, the priority level matching unit 124 determines whether or not priority levels match on the basis of the priority levels supplied from the device evaluating unit 123.

In step S36, for example, the priority level matching unit 124 determines whether or not priority levels match on the basis of the priority level of the video recorder 13-*i*, namely, "1", the priority level of the video recorder 13-*j*, namely, "2", the priority level of the video recorder 13-*k*, namely, "3", and the priority level of the video recorder 13-*m*, namely, "3", supplied from the device evaluating unit 123.

If it is determined in step S36 that the priority levels do not match, then, in step S39, the communication unit 36 transmits the reservation information to the video recorder 13 via the network 12.

Figures 12, 13:
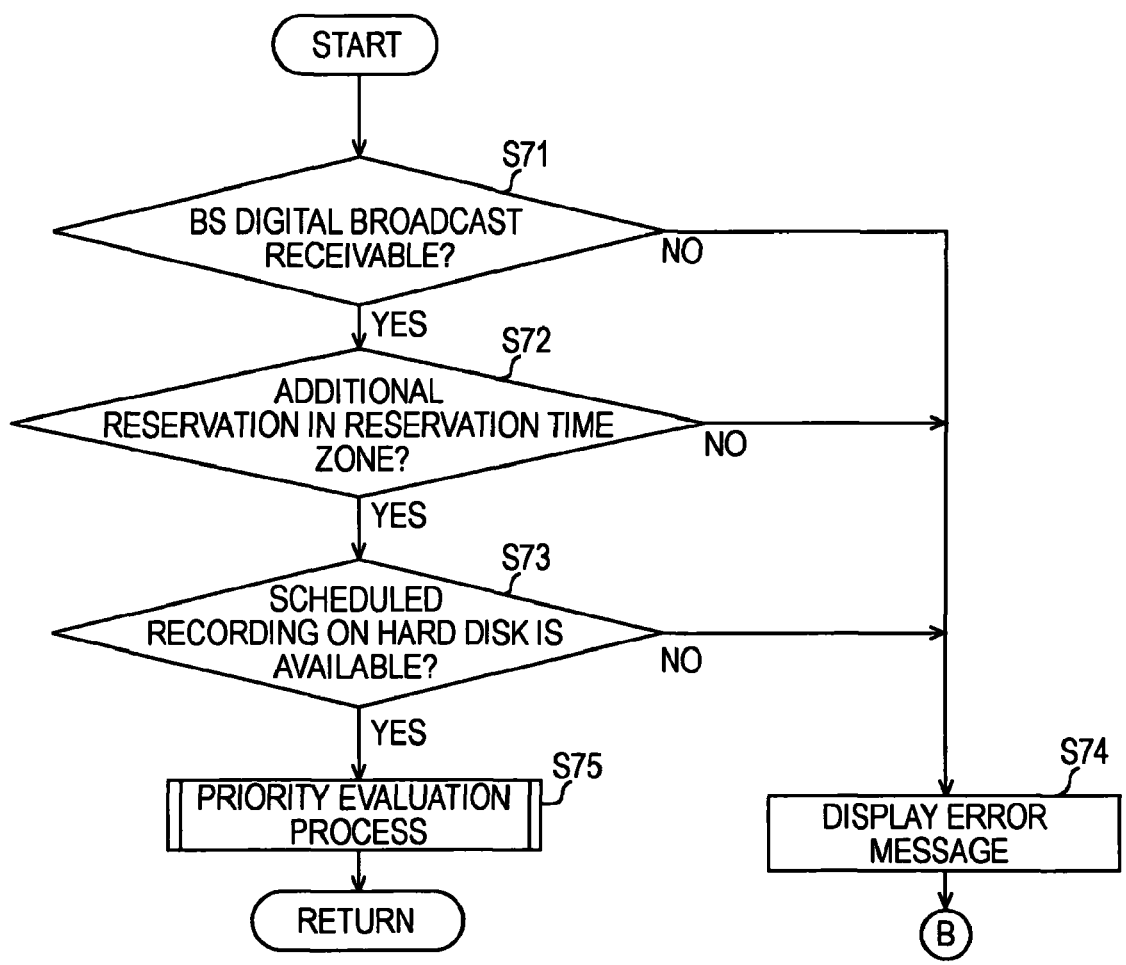
FIG. 12 is a diagram showing an example of reservation information.
FIG. 13 is a flowchart showing the details of a controlled-device evaluation process.

FIG. 12 illustrates an example of the reservation information.

In the example shown in FIG. 12, the first row includes a title, and the subsequent rows include reservation information data.

The tuner name in the second column and the second row from the top, namely, "BS digital broadcast, channel 105", indicates that the channel of the broadcast program to be recorded is channel 105 in a BS digital broadcast. The reservation time in the second column and the third row from the top, namely, "20:00 to 20:59", indicates that the reservation time of the broadcast program to be recorded ranges from 20:00 to 20:59. The recording-quality mode in the second column and the fourth row from the top, namely, "1: high quality/2: long time", indicates that the broadcast program is recorded in the high-quality video recording mode by priority and then in the long-time video recording mode if the video recording in the high-quality recording mode is not available.

Referring back to the flowchart of FIG. 9, in step S36, for example, when the priority level of the video recorder 13-$i$, namely, "1", and the priority level of the video recorder 13-$j$, namely, "2", are supplied from the device evaluating unit 123, the priority levels do not match, and the priority level matching unit 124 supplies to the communication unit 36 the reservation information shown in FIG. 12 to be transmitted to the video recorder 13-$i$ having higher evaluation result. The communication unit 36 transmits the reservation information shown in FIG. 12 supplied from the priority level matching unit 124 to the video recorder 13-$i$ via the network 12.

If it is determined in step S36 that the priority levels match, then, in step S37, the priority level matching unit 124 determines whether or not the priority levels are "3".

If it is determined in step S37 that the priority levels are "3", then, in step S41, the reservation sharing processor 125 performs a reservation sharing process. Then, the process ends. The details of the reservation sharing process are described below.

For example, when the priority level of the video recorder 13-$k$, namely, "3", and the priority level of the video recorder 13-$m$, namely, "3", are supplied from the device evaluating unit 123, the priority levels match and the priority levels are "3". In this case, the remaining recording time of the storage device 59 of each of the video recorders 13-$k$ and 13-$m$ can be insufficient as the reservation time of the broadcast program to be reserved, and the reservation sharing processor 125 performs a reservation sharing process.

Specifically, for example, a recording reservation time zone from 20:00 to 20:59 is divided into sections, e.g., 30 minutes from 20:00 and 29 minutes from 20:30, and the recording for 30 minutes from 20:00 is set in the video recorder 13-$k$ while the recording for 29 minutes from 20:30 is set in the video recorder 13-$m$. The reservation of the recording of the broadcast program whose reservation time ranges from 20:00 to 20:59 can therefore be set. The details of the reservation sharing process are described below.

If it is determined in step S37 that the priority levels is not "3", then, in step S38, the device specifying unit 121 selects a target device according to the priority of the controlled devices. In step S39, the communication unit 36 transmits the reservation information to the target device selected according to the priority via the network 12.

For example, the device specifying unit 121 selects the video recorder 13-$i$ assigned the first priority from the video recorders 13-$i$ and 13-$j$, and supplies the reservation information to the communication unit 36. The communication unit 36 transmits the reservation information supplied from the device specifying unit 121 to the video recorder 13-$i$ via the network 12.

In step S40, the external reservation processor 107 determines whether or not a plurality of recording reservations are to be set. If a plurality of recording reservations are not to be set, no more recording reservations are set, and the process returns to step S17 shown in FIG. 6. Then, the process ends.

If it is determined that a plurality of recording reservations are to be set, the process returns to step S14 shown in FIG. 6, and the processing described above is repeatedly performed. Specifically, the internal reservation processor 105 and the external reservation processor 107 repeatedly perform the processing of steps S14 to S17 to set a recording reservation in either the controller 11 or the video recorder 13.

Accordingly, the video recorder 13 that is set to record the broadcast program is selected according to the priority. Thus, the recording can be set in more optimum equipment, and the broadcast program can be recorded without fail.

The details of the controlled-device evaluation process in step S35 shown in FIG. 9 will be described with reference to a flowchart shown in FIG. 13. The controlled-device evaluation process is performed on all devices that have transmitted status responses. The controlled-device evaluation process will be described in the context of the process performed on the video recorder 13-$i$.

In step S71, the device evaluating unit 123 determines whether or not BS digital broadcasts are receivable on the basis of the status response supplied from the communication unit 36.

For example, the device evaluating unit 123 determines whether or not BS digital broadcasts are receivable on the basis of the status response shown in FIG. 11 transmitted from the video recorder 13-$i$ and supplied from the communication unit 36.

If it is determined in step S71 that BS digital broadcasts are not receivable, then, in step S74, the device evaluating unit 123 displays an error message on the screen of the LCD 39.

For example, the device evaluating unit 123 determines that BS digital broadcasts are not receivable on the basis of the status response transmitted from the video recorder 13-$p$ and supplied from the communication unit 36, which is a status response at least including the tuner name indicating that BS digital broadcasts are not receivable. The device evaluating unit 123 displays an error message indicating that the video recorder 13-$p$ is not capable of receiving BS digital broadcasts on the screen of the LCD 39.

If it is determined in step S71 that BS digital broadcasts are receivable, then, in step S72, the device evaluating unit 123 determines whether or not an additional recording reservation at the reservation time can be set on the basis of the status response supplied from the communication unit 36.

For example, the device evaluating unit 123 determines whether or not an additional recording reservation at the reservation time is settable on the basis of the status response shown in FIG. 11 transmitted from the video recorder 13-$i$ and supplied from the communication unit 36, which is the status response shown in FIG. 11 at least including the tuner name indicating that BS digital broadcasts are receivable, the reservation setting information indicating that an additional recording reservation in the time zone from 20:00 to 20:59 can be set (which is reservation setting information concerning "21:00 to 22:00", which is shifted in time from the reservation time "20:00 to 20:59", so that an additional recording reservation in the time zone from "20:00 to 20:59" can be set), and the storage device name indicating that scheduled recording on a hard disk is settable.

If it is determined in step S72 that no additional recording reservation at the reservation time can be set, then, in step S74, the device evaluating unit 123 displays an error message on the screen of the LCD 39.

For example, the device evaluating unit 123 determines that no additional recording reservation at the reservation time can be set on the basis of the status response transmitted from the video recorder 13-*p* and supplied from the communication unit 36, which is a status response at least including the reservation setting information indicating that no additional recording reservation in the time zone from 20:00 to 20:59 can be set. The device evaluating unit 123 displays an error message indicating that no additional recording reservation in the time zone from 20:00 to 20:59 can be set in the video recorder 13-*p* on the screen of the LCD 39.

If it is determined in step S72 that an additional recording reservation in the reservation time zone can be set, then, in step S73, the device evaluating unit 123 determines whether or not the scheduled recording on the hard disk is settable on the basis of the status response supplied from the communication unit 36.

For example, the device evaluating unit 123 determines whether or not the scheduled recording on the hard disk is settable on the basis of the status response shown in FIG. 11 transmitted from the video recorder 13-*i* and supplied from the communication unit 36, which is the status response shown in FIG. 11 at least including the tuner name indicating that BS digital broadcasts are receivable, the reservation setting information indicating that an additional recording reservation in the time zone from 20:00 to 20:59 can be set, and the storage device name indicating that the scheduled recording on the hard disk is settable.

If it is determined in step S73 that the scheduled recording on the hard disk is not settable, then, in step S74, the device evaluating unit 123 displays an error message on the screen of the LCD 39.

For example, the device evaluating unit 123 determines that the scheduled recording on the hard disk is not settable on the basis of the status response transmitted from the video recorder 13-*p* and supplied from the communication unit 36, which is a status response at least including the storage device name indicating that scheduled recording on a hard disk is not settable. The device evaluating unit 123 displays an error message indicating that the video recorder 13-*p* is not able to set the scheduled recording on the hard disk on the screen of the LCD 39.

If it is determined in step S73 that the scheduled recording on the hard disk is settable, then, in step S75, the device evaluating unit 123 performs a priority evaluation process. Then, the process returns to step S35 shown in FIG. 9, and the processing after step S36 is performed.

For example, the device evaluating unit 123 determines that the scheduled recording on the hard disk is settable on the basis of the status response shown in FIG. 11 transmitted from the video recorder 13-*i* and supplied from the communication unit 36, which is the status response shown in FIG. 11 at least including the tuner name indicating that BS digital broadcasts are receivable, the reservation setting information indicating that an additional recording reservation in the time zone from 20:00 to 20:59 can be set, and the storage device name indicating that the scheduled recording on the hard disk is settable. Then, the process proceeds to step S75.

In step S75, the device evaluating unit 123 performs a priority evaluation process.

In step S75, for example, the device evaluating unit 123 supplies the priority level assigned to the video recorder 13-*i* as a result of the priority evaluation process, namely, "1", to the priority level matching unit 124. The details of the priority evaluation process are described below.

The items to be evaluated in the controlled-device evaluation process shown in FIG. 13 are, for example, the "BS digital broadcast" field evaluated in step S71, the "reservation time" field evaluated in step S72, and the "hard disk" field evaluated in step S73. These items correspond to those selected by the user in steps S11 and S12 shown in FIG. 6. For example, when the user selects the storage device name "DVD", the "DVD" field is also evaluated.

While the description has been made in the context of the video recorder 13-*i*, the device evaluating unit 123 also performs the controlled-device evaluation process on the video recorders 13-*j*, 13-*k*, and 13-*m* in a similar manner.

For example, the device evaluating unit 123 supplies the priority level assigned to the video recorder 13-*j* as a result of the priority evaluation process, namely, "2", to the priority level matching unit 124. Likewise, the device evaluating unit 123 supplies the priority levels assigned to the video recorders 13-*k* and 13-*m* as results of the priority evaluation process, namely, "3", to the priority level matching unit 124.

Figure 14:
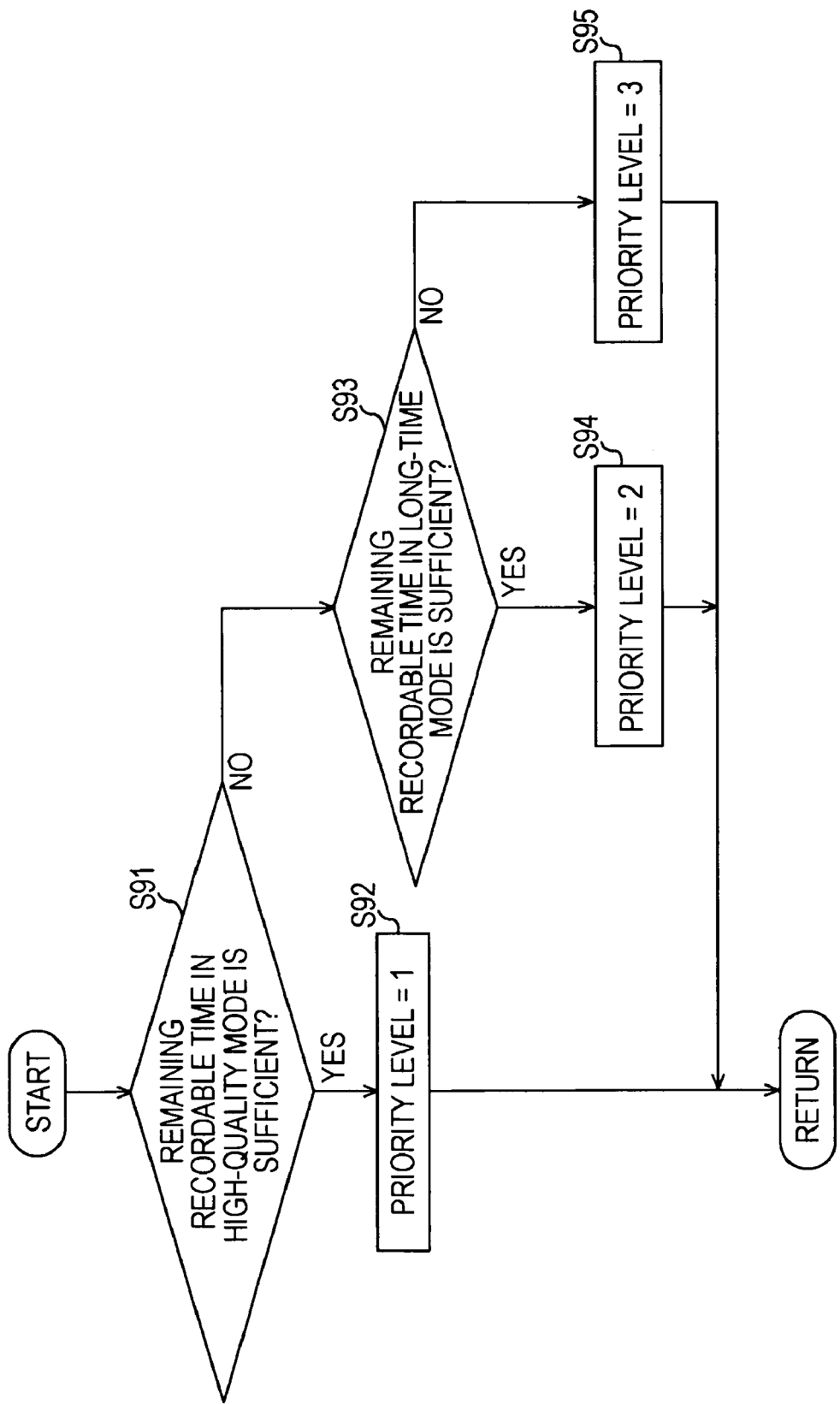
FIG. 14 is a flowchart showing the details of a priority evaluation process.

The details of the priority evaluation process in step S75 shown in FIG. 13 will be described with reference to a flowchart shown in FIG. 14.

In step S91, the device evaluating unit 123 determines whether or not the remaining recordable time in the high-quality recording mode is sufficient on the basis of the response status supplied from the communication unit 36.

If it is determined in step S91 that the remaining recordable time in the high-quality recording mode is sufficient, then, in step S92, the device evaluating unit 123 supplies priority level "1" as an evaluation result to the priority level matching unit 124. Then, the process returns to step S75 shown in FIG. 13, and the processing after step S75 is performed.

For example, the device evaluating unit 123 determines that the remaining recordable time of the video recorder 13-*i* in the high-quality recording mode is sufficient on the basis of the status response shown in FIG. 11 transmitted from the video recorder 13-*i* and supplied from the communication unit 36, which is the status response shown in FIG. 11 at least including the remaining recording time "high quality: 1 hr/long time: 2 hr" (that is, the device evaluating unit 123 determines that the recording of the broadcast program in the reservation time zone from 20:00 to 20:59 is available because of the ability of one-hour video recording in the high-quality recording mode), and supplies priority level "1" assigned to the video recorder 13-*i* to the priority level matching unit 124 as an evaluation result.

If it is determined in step S91 that the remaining recordable time in the high-quality recording mode is not sufficient, then, in step S93, the device evaluating unit 123 determines whether or not the remaining recording time in the long-time recording mode is sufficient.

If it is determined in step S93 that the remaining recording time in the long-time recording mode is sufficient, then, in step S94, the device evaluating unit 123 supplies priority level "2" as an evaluation result to the priority level matching unit 124. Then, the process returns to step S75 shown in FIG. 13, and the processing after step S75 is performed.

For example, the device evaluating unit 123 determines that the remaining recordable time of the video recorder 13-*j* in the long-time recording mode is sufficient on the basis of the status response transmitted from the video recorder 13-*j* and supplied from the communication unit 36, which is a status response at least including the remaining recording time indicating that the remaining recordable time in the long-time recording mode is sufficient although the remaining recordable time in the high-quality recording mode is not sufficient, and supplies priority level "2" assigned to the video recorder 13-*j* to the priority level matching unit 124 as an evaluation result.

If it is determined in step S93 that the remaining recording time in the long-time recording mode is not sufficient, then, in step S95, the device evaluating unit 123 supplies priority level "3" as an evaluation result to the priority level matching unit 124. Then, the process returns to step S75 shown in FIG. 13, and the processing after step S75 is performed.

For example, the device evaluating unit 123 determines that the remaining recordable time of the video recorder 13-*k* in the long-time recording mode is not sufficient on the basis of the status response transmitted from the video recorder 13-*k* and supplied from the communication unit 36, which is a status response at least including the remaining recording time indicating that the remaining recordable time in the high-quality recording mode and the remaining recordable time in the long-time recording mode are not sufficient, and supplies priority level "3" assigned to the video recorder 13-*k* to the priority level matching unit 124 as an evaluation result. Likewise, the device evaluating unit 123 supplies priority level "3" assigned to the video recorder 13-*m* to the priority level matching unit 124 as an evaluation result.

Figure 15:
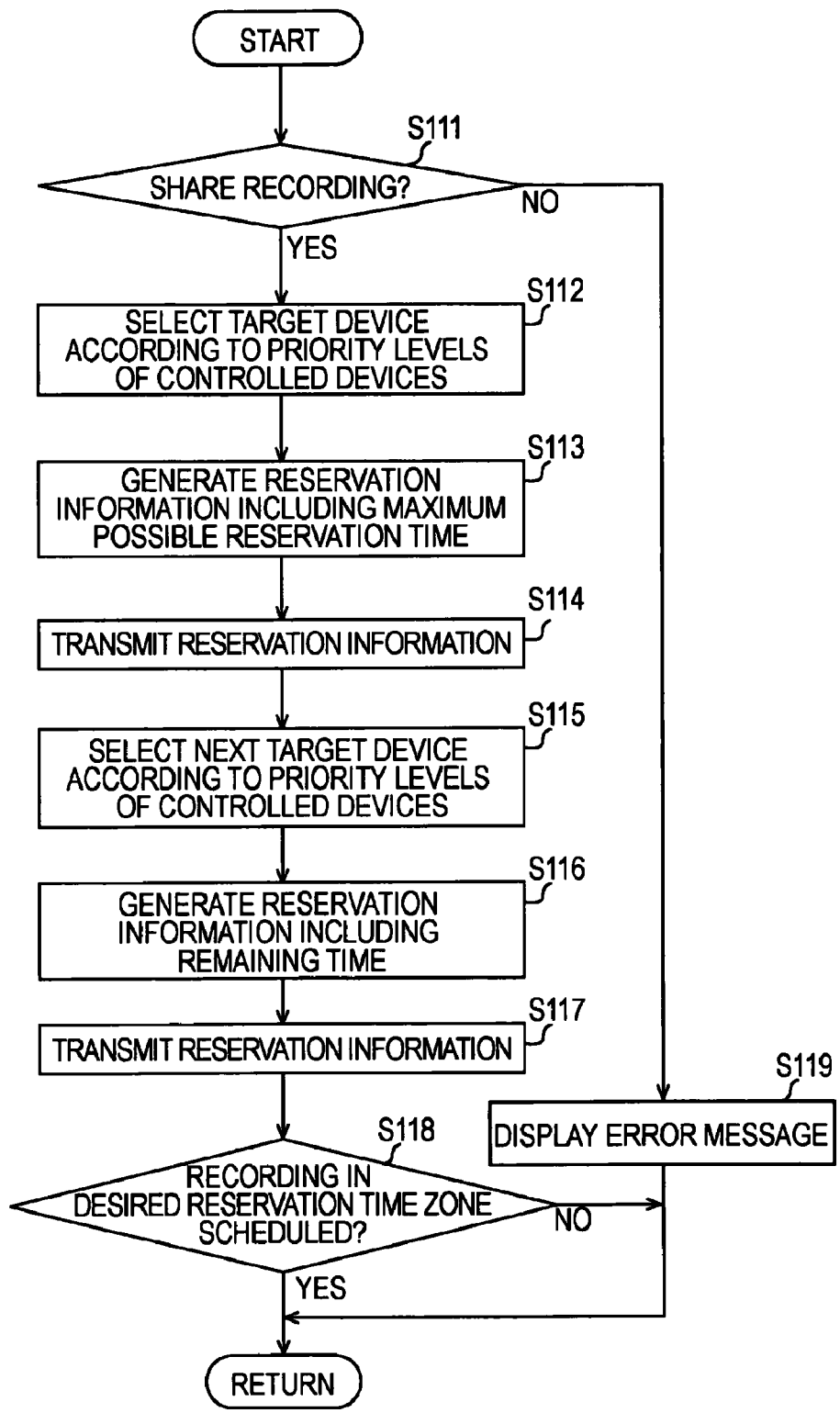
FIG. 15 is a flowchart showing the details of a reservation sharing process.

The details of the reservation sharing process in step S41 shown in FIG. 9 will be described with reference to a flowchart shown in FIG. 15. The reservation sharing process will be described herein in the context of a reservation sharing process performed on the video recorders 13-*k* and 13-*m*.

In step S111, the reservation sharing processor 125 determines whether or not the recording is to be shared.

If it is determined in step S111 that recording is not to be shared, then, in step S119, the reservation sharing processor 125 displays an error message on the screen of the LCD 39. Then, the process returns to step S41 shown in FIG. 9, and the processing after step S41 is performed.

For example, when no equipment with the recording reservation is to be shared exist or the remaining recording time of the storage device of the equipment with which the recording reservation is to be shared is not sufficient, the reservation sharing processor 125 displays an error message indicating that the recording is not to be shared on the screen of the LCD 39.

If it is determined in step S111 that the recording is to be shared, then, in step S112, the reservation sharing processor 125 selects a first target device according to the priority levels of the controlled devices.

In step S112, for example, when the priority levels of the video recorders 13-*k* and 13-*m* assigned priority level "3" that are recorded on the device setting information manager 102 and that are supplied from the internal reservation processor 105 are "1" and "2", respectively, the video recorder 13-*k* with priority level "1" is higher in priority than the video recorder 13-*m* with priority level "2", and the reservation sharing processor 125 selects the video recorder 13-*k* assigned priority level "1".

In step S113, the reservation sharing processor 125 generates reservation information concerning the maximum possible reservation time. The reservation sharing processor 125 supplies the generated reservation information concerning the maximum possible reservation time to the communication unit 36.

For example, in step S113, based on the status response transmitted from the video recorder 13-*k* and supplied from the communication unit 36, when the available recording time of the video recorder 13-*k* is 30 minutes, the video recorder 13-*k* is able to perform recording for up to 30 minutes. The reservation sharing processor 125 generates reservation information at least including the maximum possible reservation time, namely, "30 minutes from 20:00", and supplies the generated reservation information to the communication unit 36.

The reservation sharing processor 125 may supply reservation information including the maximum possible reservation time, namely, "30 minutes from 20:00", and other information, such as the tuner name indicating that BS digital broadcasts are receivable, the reservation setting information indicating that an additional recording reservation in the time zone from 20:00 to 20:59 can be set, and the storage device name indicating that scheduled recording on a hard disk is settable, to the communication unit 36.

In step S114, the communication 36 transmits the reservation information supplied from the reservation sharing processor 125 to the first target device via the network 12.

In step S114, for example, the communication unit 36 transmits reservation information at least including the maximum possible reservation time, namely, "30 minutes from 20:00", to the video recorder 13-*k* via the network 12.

In step S115, the reservation sharing processor 125 selects a second target device according to the priority levels assigned to the controlled devices.

In step S115, for example, when the priority levels of the video recorders 13-*k* and 13-*m* assigned priority level "3" that are recorded on the device setting information manager 102 and that are supplied from the internal reservation processor 105 are "1" and "2", respectively, the reservation sharing processor 125 selects the video recorder 13-*m* assigned priority level "2", which is the second highest priority to the video recorder 13-*k* assigned priority level "1".

In step S116, the reservation sharing processor 125 generates reservation information concerning the remaining time. The reservation sharing processor 125 supplies the generated reservation information concerning the remaining time to the communication unit 36.

In step S116, based on the status response transmitted from the video recorder 13-*m* and supplied from the communication unit 36, for example, when the available recording time of the video recorder 13-*m* is 45 minutes, the video recorder 13-*m* is able to perform recording for up to 45 minutes. Since the recording on the video recorder 13-*k* for 30 minutes in the reservation time zone from "20:00 to 20:59" has been set in step S113, the reservation sharing processor 125 generates reservation information at least including the remaining reservation time, namely, "29 minutes from 20:30", and supplies the generated reservation information to the communication unit 36.

The reservation sharing processor 125 may supply reservation information including the remaining time, namely, "29 minutes from 20:30", and other information, such as the tuner name indicating that BS digital broadcasts are receivable, the reservation setting information indicating that an additional recording reservation in the time zone from 20:00 to 20:59 can be set, and the available storage device indicating that scheduled recording on a hard disk is settable, to the communication unit 36.

In step S117, the communication unit 36 transmits the reservation information supplied from the reservation sharing processor 125 to the second target device via the network 12.

In step S117, for example, the communication unit 36 transmits reservation information at least including the remaining time, namely, "29 minutes from 20:30", to the video recorder 13-*m* via the network 12.

In step S118, the reservation sharing processor 125 determines whether or not the recording in the desired reservation time zone has been scheduled. If the recording in the desired reservation time zone has been scheduled, the process returns to step S41 shown in FIG. 9, and, then, the process ends.

For example, when the reservation sharing processor 125 transmits reservation information at least including the maximum possible reservation time, namely, "30 minutes from 20:00", to the video recorder 13-*k*, and transmits reservation information at least including the remaining time, namely, "29 minutes from 20:30", to the video recorder 13-*m*, the recording in the desired reservation time zone from "20:00 to 20:59" has been scheduled. Thus, the reservation sharing process ends.

If the recording in the desired reservation time zone has not been scheduled in step S118, then, in step S119, the reservation sharing processor 125 displays an error message on the screen of the LCD 39. Then, the process returns to step S41 shown in FIG. 9, and the processing after step S41 is performed.

For example, when no equipment with which the recording reservation is to be shared exist or the remaining recording time of the storage device of the equipment with which the recording reservation is to be shared is not sufficient, the reservation sharing processor 125 displays an error message indicating that the recording in the desired reservation time zone is not settable although the recording reservation has been shared on the screen of the LCD 39.

Therefore, the recording of the broadcast program can be shared. For example, a long-time broadcast program or a broadcast program that may require continuous recording reservation can be recorded without fail.

The details of the reservation setting process performed by the controller 11 have been described. The details of a reservation setting process performed by the video recorder 13 will be described with reference to FIG. 16.

Figure 16:
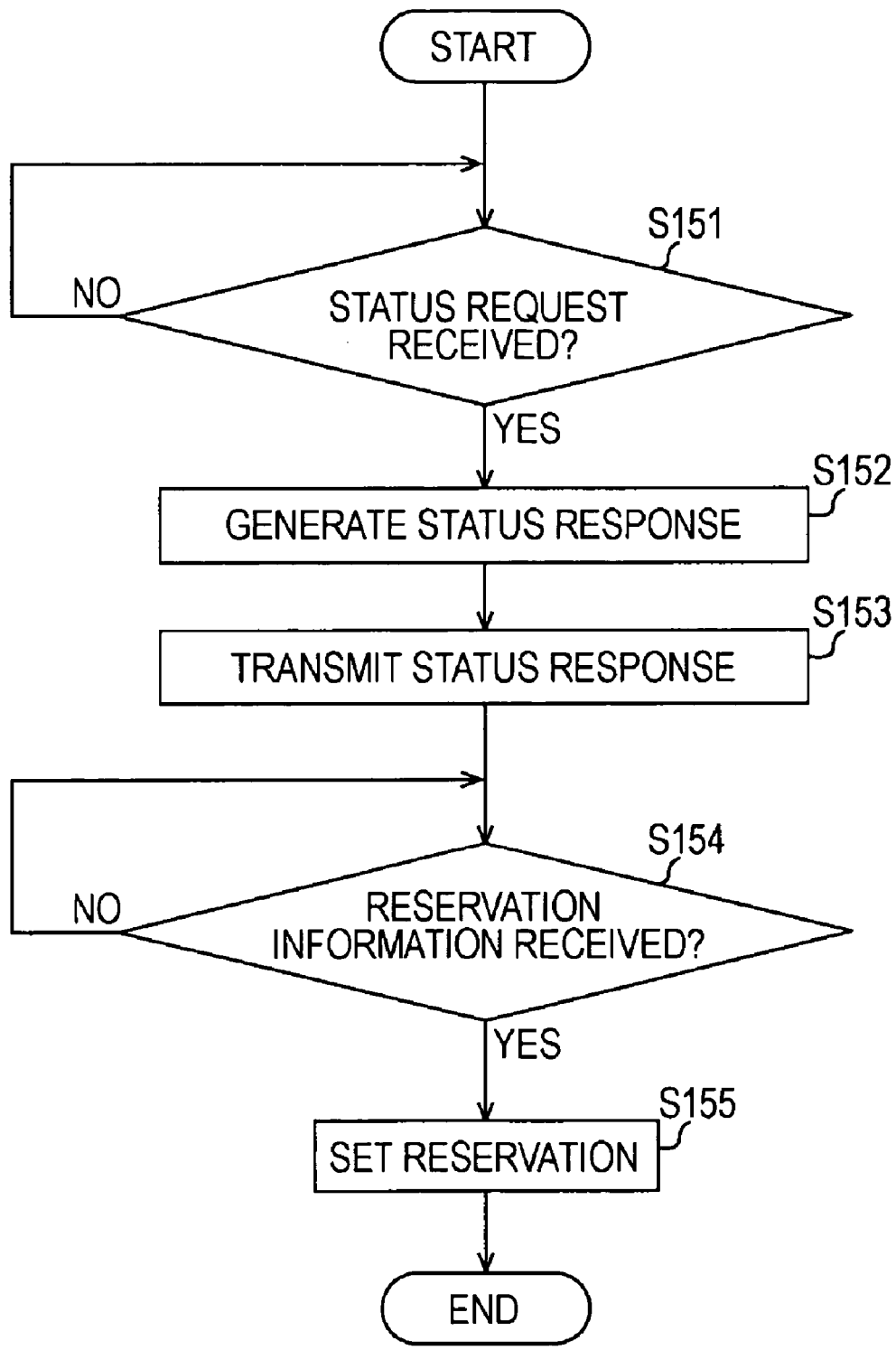
FIG. 16 is a flowchart showing the details of a reservation setting process performed by the video recorder.

FIG. 16 is a flowchart showing a reservation setting process performed by the video recorder 13. The reservation setting process will be described herein in the context of a reservation setting process performed by the video recorder 13-*k*.

In step S151, the reservation processor 201 determines whether or not a status request has been received on the basis of a status request that is transmitted from the controller 11 and that is supplied from the communication unit 56. For example, the reservation processor 201 of the video recorder 13-*i* determines whether or not the status request shown in FIG. 10 has been received on the basis of the status request shown in FIG. 10 transmitted from the controller 11 and supplied from the communication unit 56 of the video recorder 13-*i*.

If it is determined in step S151 that no status request has been received, the process returns to step S151, and the processing described above is repeatedly performed. That is, the video recorder 13 stands by until a status request has been received from the controller 11 via the network 12.

If it is determined in step S151 that a status request has been received, then, in step S152, the status response generator 211 generates a status response, and supplies the generated status response to the communication unit 56.

For example, the device information obtaining unit 203 of the video recorder 13-*i* obtains the tuner name "BS digital broadcast", the external connected device name "child's room hard disk recorder", the storage device name "hard disk", the codec format "MPEG2", the recording-quality mode "high quality/long time", the remaining recording time "high quality: 1 hr/long time: 2 hr", and the simultaneous reservation availability information representing "no" from the device setting information manager 204 of the video recorder 13-*i*, and supplies the obtained information to the reservation processor 201 of the video recorder 13-*i*. The status response generator 211 of the video recorder 13-*i* obtains the reservation setting information "21:00 to 22:00" from the reservation information manager 202. The status response generator 211 of the video recorder 13-*i* generates the status response shown in FIG. 11 based on the information supplied from the device information obtaining unit 203, namely, the tuner name "BS digital broadcast", the external connected device name "child's room hard disk recorder", the storage device name "hard disk", the codec format "MPEG2", the recording-quality mode "high quality/long time", the remaining recording time "high quality: 1 hr/long time: 2 hr", and the simultaneous reservation availability information indicating "no", and the obtained reservation setting information, namely, "21:00 to 22:00", and supplies the generated status response shown in FIG. 11 to the communication unit 56.

In step S153, the communication unit 56 transmits the status response supplied from the status response generator 211 to the controller 11 via the network 12. For example, the communication unit 56 of the video recorder 13-*i* transmits the status response supplied from the status response generator 211 of the video recorder 13-*i* to the controller 11 via the network 12.

In step S154, the reservation processor 201 determines whether or not reservation information has been received on the basis of reservation information that is transmitted from the controller 11 and that is supplied from the communication unit 56. For example, the reservation processor 201 of the video recorder 13-*i* determines whether or not the reservation information shown in FIG. 12 has been received on the basis of the reservation information shown in FIG. 12 that is transmitted from the controller 11 and that is supplied from the communication unit 56 of the video recorder 13-*i*.

If it is determined in step S154 that no reservation information has been received, the process returns to step S154, and the processing described above is repeatedly performed. That is, the video recorder 13 stands by until reservation information has been received from the controller 11 via the network 12.

If it is determined in step S154 that reservation information has been received, then, in step S155, the reservation processor 201 records the reservation information supplied from the communication unit 56 on the reservation information manager 202 to set a recording reservation. Then, the process ends.

For example, the reservation processor 201 of the video recorder 13-*i* records the reservation information shown in FIG. 12 supplied from the communication unit 56 of the video recorder 13-*i* on the reservation information manager 202 of the video recorder 13-*i* to set a video recording reservation of the program on channel 105 in the BS digital broadcast in a time zone from 20:00 to 20:59.

Therefore, the video recorder 13 implements simple functions of returning a status response to the status request transmitted from the controller 11 via the network 12, setting a recording reservation according to the reservation information transmitted from the controller 11, etc. Thus, the video recording reservation system 1 is implemented using minimum load.

While the description has been made in the context of the video recorder 13-*i*, the video recorder 13-*j* also performs the reservation setting process in a similar manner.

The details of the reservation setting process performed by the video recorder 13 has been described.

A video recording process for performing video recording based on the recording reservation set by the reservation setting process for setting reservation of recording of a broadcast program (see FIGS. 6 to 16) will be described with reference to FIGS. 17 to 20. As discussed above, there are cases of setting a recording reservation in the controller 11 (the processing of step S15 shown in FIG. 6) and setting a recording reservation in the video recorder 13 (the processing of step S17 shown in FIG. 6). The video recording process in the case of setting a recording reservation in the controller 11 will first be described with reference to FIGS. 17 and 18, and the video recording process in the case of setting a recording reservation in the video recorder 13 will then be described with reference to FIGS. 19 and 20.

The video recording process in the case of setting a recording reservation in the controller 11 will be described hereinafter with reference to FIGS. 17 and 18. First, the details of the video recording process performed by the controller 11 will be described with reference to FIG. 17, and, then, the details of the video recording process performed by the video recorder 13 will be described with reference to FIG. 18.

Figure 17:
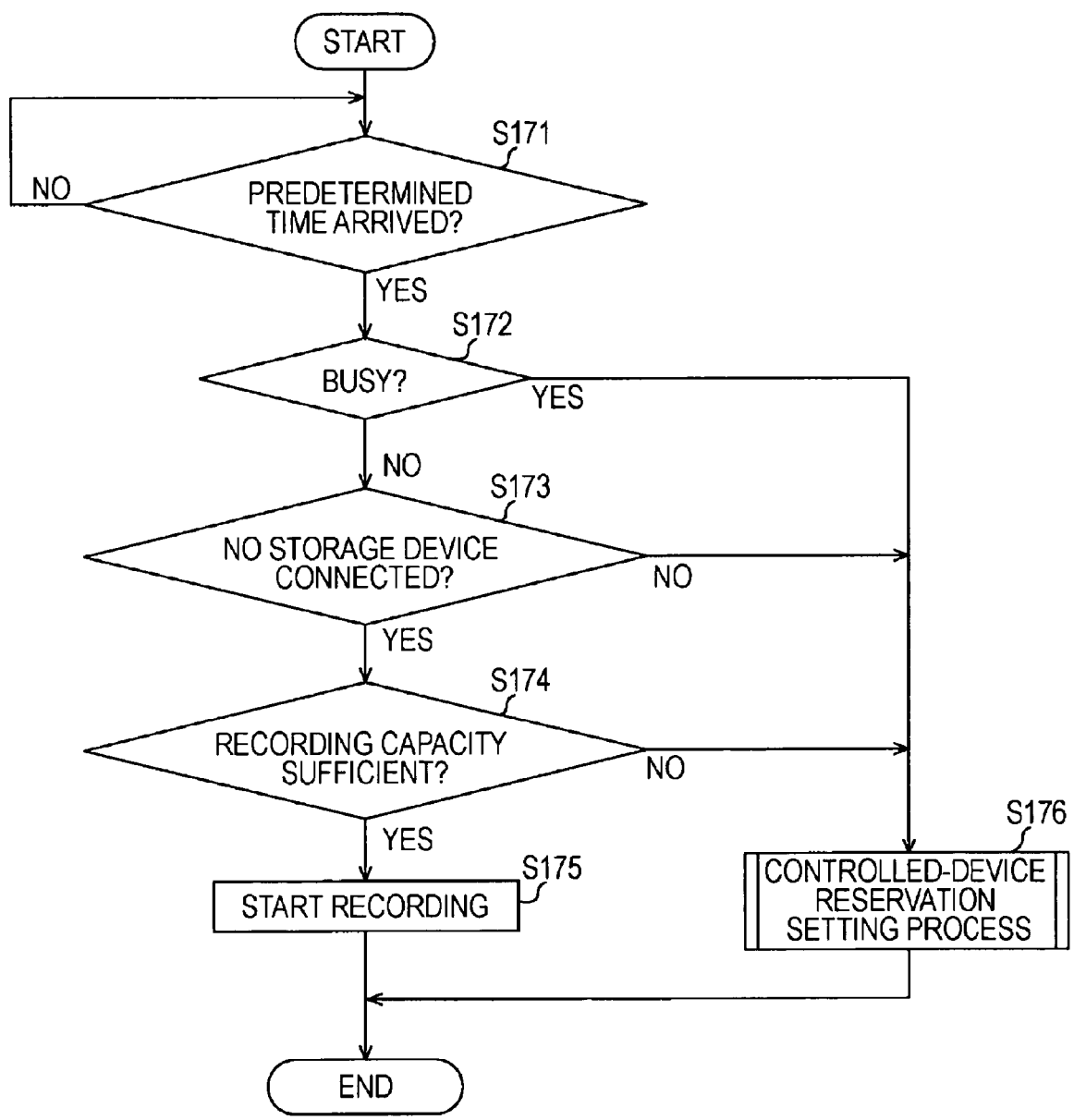
FIG. 17 is a flowchart showing a video recording process performed by the controller.
Figure 18:
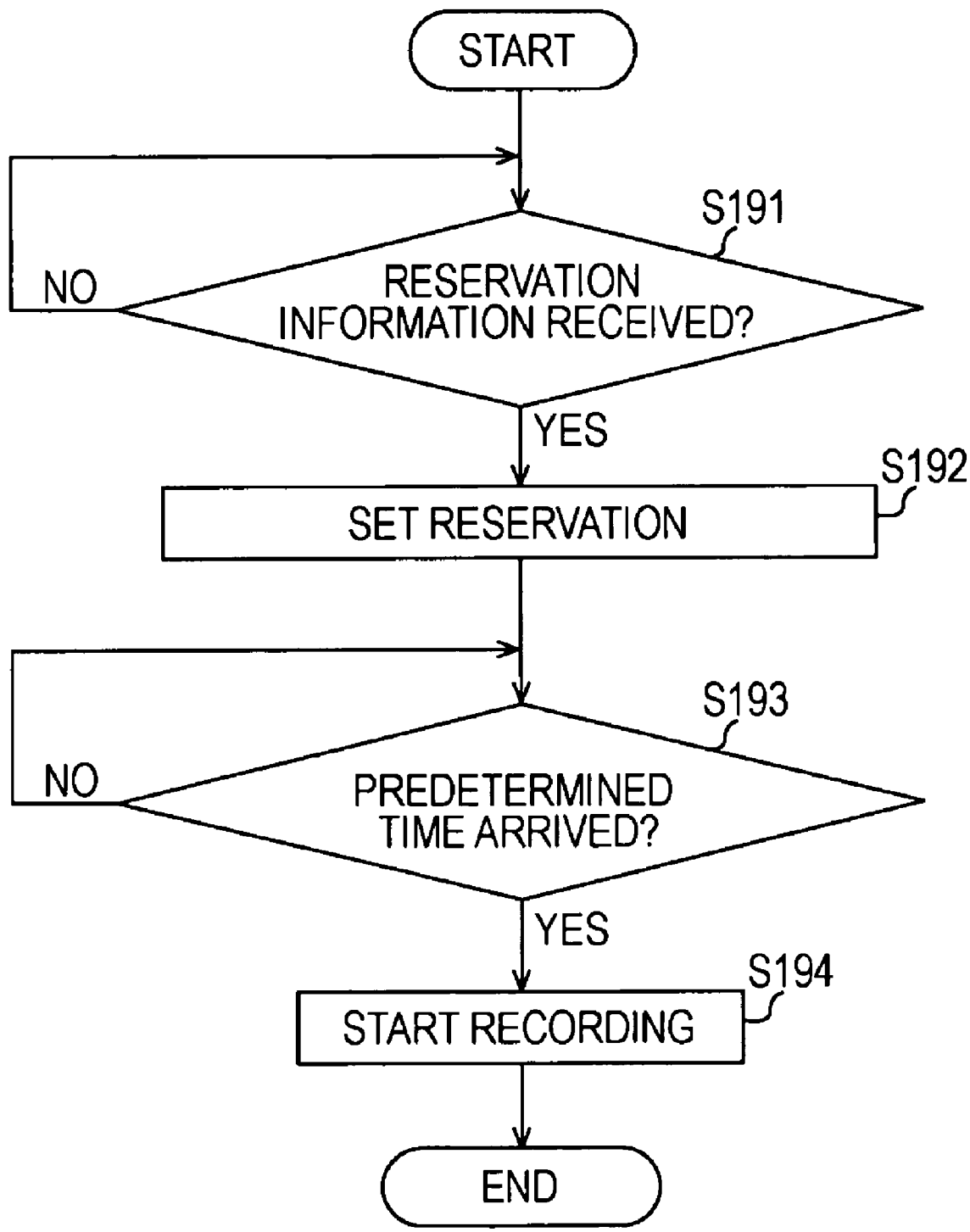
FIG. 18 is a flowchart showing the details of a video recording process performed by the video recorder.

FIG. 17 is a flowchart showing a video recording process performed by the controller 11.

In step S171, the recording processor 108 determines whether or not a predetermined time has arrived. For example, the recording processor 108 determines whether or not a time immediately before the set recording start time of the reserved broadcast program, namely, "20:00", has arrived on the basis of the reservation information retrieved from the reservation information manager 106.

If it is determined in step S171 that the predetermined time has not arrived, the process returns to step S171, and the processing described above is repeatedly performed. That is, the controller 11 stands by until a time immediately before the start of the recording.

If it is determined in step S171 that the predetermined time has arrived, then, in step S172, the recording processor 108 determines whether or not the controller 11 is busy.

If it is determined in step S172 that the controller 11 is busy, the controller 11 is not able to perform the recording, and then, in step S176, the external reservation processor 107 performs a controlled-device reservation setting process to set a recording reservation in another device, that is, the video recorder 13. The controlled-device reservation setting process is similar to the controlled-device reservation setting process described above with reference to FIGS. 9 to 14, and a description thereof is thus omitted.

For example, in the middle of playback or the like, if it is determined that the controller 11 is busy, for example, the recording processor 108 supplies the reservation information to the external reservation processor 107. The external reservation processor 107 performs the controlled-device reservation setting process according to the reservation conditions supplied from the internal reservation processor 105 and the reservation information supplied from the recording processor 108.

If it is determined in step S172 that the controller 11 is not busy, then, in step S173, the recording processor 108 determines whether or not a storage device is connected. For example, the recording processor 108 determines whether or not the storage device 41 is connected to the data input/output interface 40.

If it is determined in step S173 that no storage device is connected, as described above, the controller 11 is not able to perform the recording, and, in step S176, the external reservation processor 107 performs a controlled-device reservation setting process to set a recording reservation in another device, that is, the video recorder 13.

For example, when it is determined that the storage device 41, which is a DVD, is not set in the drive (data input/output interface 40), the recording processor 108 supplies the reservation information to the external reservation processor 107. The external reservation processor 107 performs a controlled-device reservation setting process according to the reservation conditions supplied from the internal reservation processor 105 and the reservation information supplied from the recording processor 108.

If it is determined in step S173 that a storage device is connected, then, in step S174, the recording processor 108 determines whether or not the recording capacity of the storage device is sufficient. For example, the recording processor 108 determines whether or not the recording capacity of the storage device 41 connected to the data input/output interface 40, which is a hard disk, is sufficient.

If it is determined in step S174 that the recording capacity of the storage device is insufficient, as described above, the controller 11 is not able to perform the recording, and, in step S176, the external reservation processor 107 performs a controlled-device reservation setting process to set a recording reservation in another device, that is, the video recorder 13.

For example, if it is determined that the recording capacity of the storage device 41, which is a hard disk, is insufficient, the recording processor 108 supplies the reservation information to the external reservation processor 107. The external reservation processor 107 performs a controlled-device reservation setting process according to the reservation conditions supplied from the internal reservation processor 105 and the reservation information supplied from the recording processor 108.

If it is determined in step S174 that the recording capacity of the storage device is sufficient, then, in step S175, the recording processor 108 starts the recording of the broadcast program on the basis of the reservation information retrieved from the reservation information manager 106. Then, the process ends. For example, the recording processor 108 causes the codec processor 37 to perform the recording of channel "BS digital broadcast, channel 105" onto the storage device 41, which is a hard disk, in a time zone from 20:00 to 20:59 on the basis of the reservation information retrieved from the reservation information manager 106.

Accordingly, when continuous recording, such as recording of all terrestrial digital broadcasts, is to be set, devices that can be set to perform the recording are periodically (continuously) searched for over the network until a time immediately before the set reservation time. When a device satisfying the conditions is searched for, a recording reservation is set in the searched device. Therefore, the broadcast programs can be recorded without fail.

The details of the video recording process performed by the controller 11 have been described. The details of a video recording process performed by the video recorder 13 will be described with reference to FIG. 18. The video recording process is performed by the video recorder 13 that receives the reservation information transmitted from the controller 11 in the controlled-device reservation setting process in step S176 shown in FIG. 17. The video recording process will be described herein in the context of a video recording process performed by the video recorder 13-*i*.

In step S191, the reservation processor 201 determines whether or not reservation information has been received on the basis of reservation information that is transmitted from the controller 11 and that is supplied from the communication unit 56. For example, the reservation processor 201 of the video recorder 13-i determines whether or not the reservation information shown in FIG. 12 has been received on the basis of the reservation information shown in FIG. 12 transmitted from the controller 11 and supplied from the communication unit 56 of the video recorder 13-i.

If it is determined in step S191 that no reservation information has been received, the process returns to step S191, and the processing described above is repeatedly performed. That is, the video recorder 13 stands by until reservation information has been received from the controller 11 via the network 12.

If it is determined in step S191 that reservation information has been received, then, in step S192, the reservation processor 201 records the reservation information supplied from the communication unit 56 on the reservation information manager 202 to set a recording reservation. For example, the reservation processor 201 of the video recorder 13-i records the reservation information shown in FIG. 12 supplied from the communication unit 56 of the video recorder 13-i on the reservation information manager 202 of the video recorder 13-i to set a reservation for recording the BS digital broadcast program on channel 105 in a time zone from 20:00 to 20:59.

In step S193, the recording processor 205 determines whether or not a predetermined time has arrived. For example, the recording processor 205 of the video recorder 13-i determines whether or not a time immediately before the set recording start time of the reserved broadcast program, namely, "20:00", has arrived on the basis of the reservation information retrieved from the reservation information manager 202 of the video recorder 13-i.

If it is determined in step S193 that the predetermined time has not arrived, the process returns to step S193, and the processing described above is repeatedly performed. That is, the video recorder 13 stands by until a time immediately before the start of the recording.

If it is determined in step S193 that the predetermined time has arrived, then, in step S194, the recording processor 205 starts the recording of the broadcast program. For example, the recording processor 205 of the video recorder 13-i causes the codec processor 57 of the video recorder 13-i to perform the recording of channel "BS digital broadcast, channel 105" onto the storage device 59 of the video recorder 13-i, which is a hard disk, in a time zone from 20:00 to 20:59 on the basis of the reservation information retrieved from the reservation information manager 202 of the video recorder 13-i.

While the description has been made in the context of the video recorder 13-i, the video recorder 13-j also performs the video recording process in a similar manner.

The details of the video recording process performed by the recording apparatus 13 have been described.

The video recording process in the case of setting a recording reservation in the video recorder 13 will be described hereinbelow with reference to FIGS. 19 and 20. First, the details of the video recording process performed by the video recorder 13 will be described with reference to FIG. 19, and, then, the details of the video recording process performed by the controller 11 will be described reference to FIG. 20.

Figure 19:
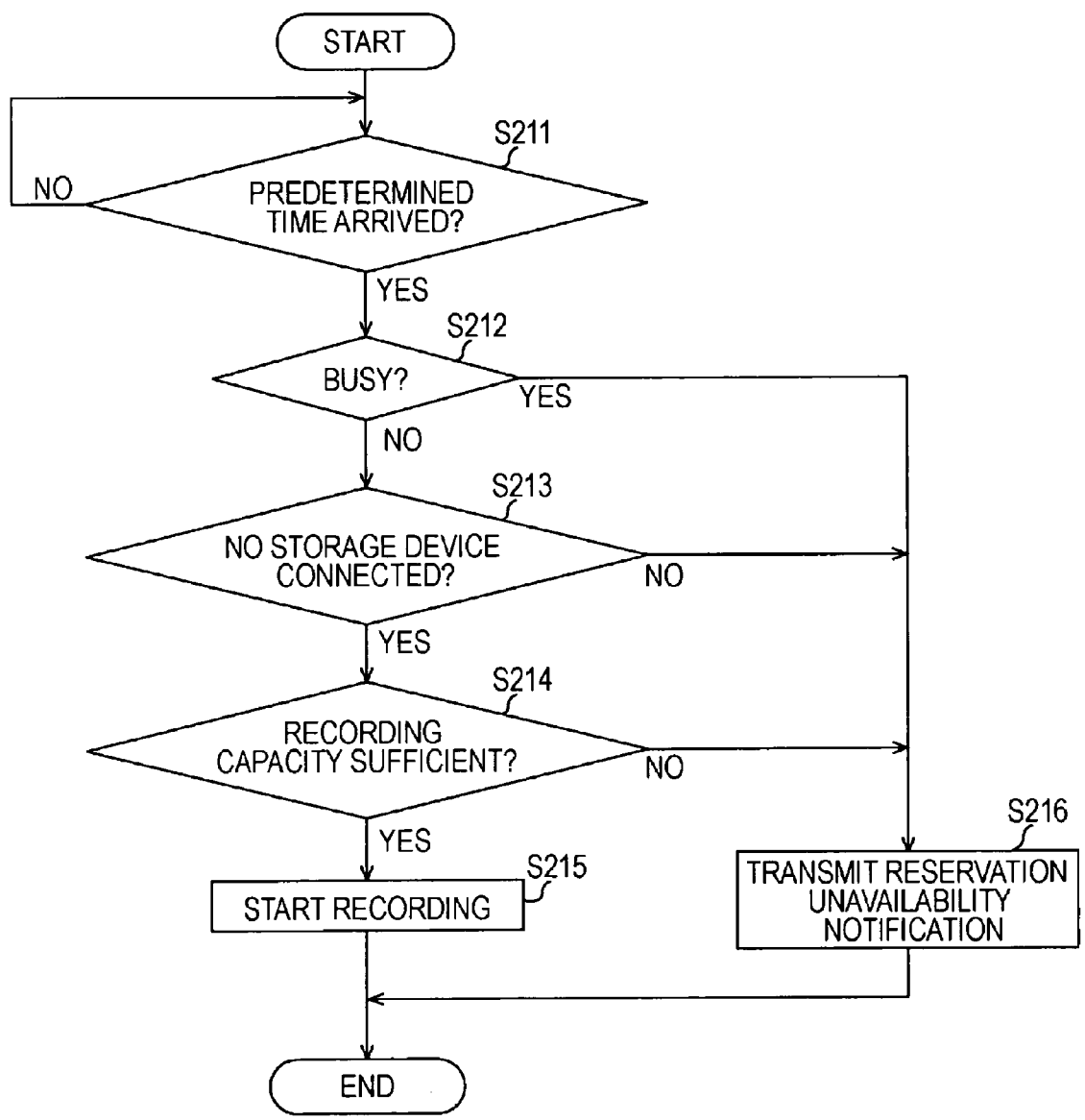
FIG. 19 is a flowchart showing a video recording process performed by the video recorder.
Figure 20:
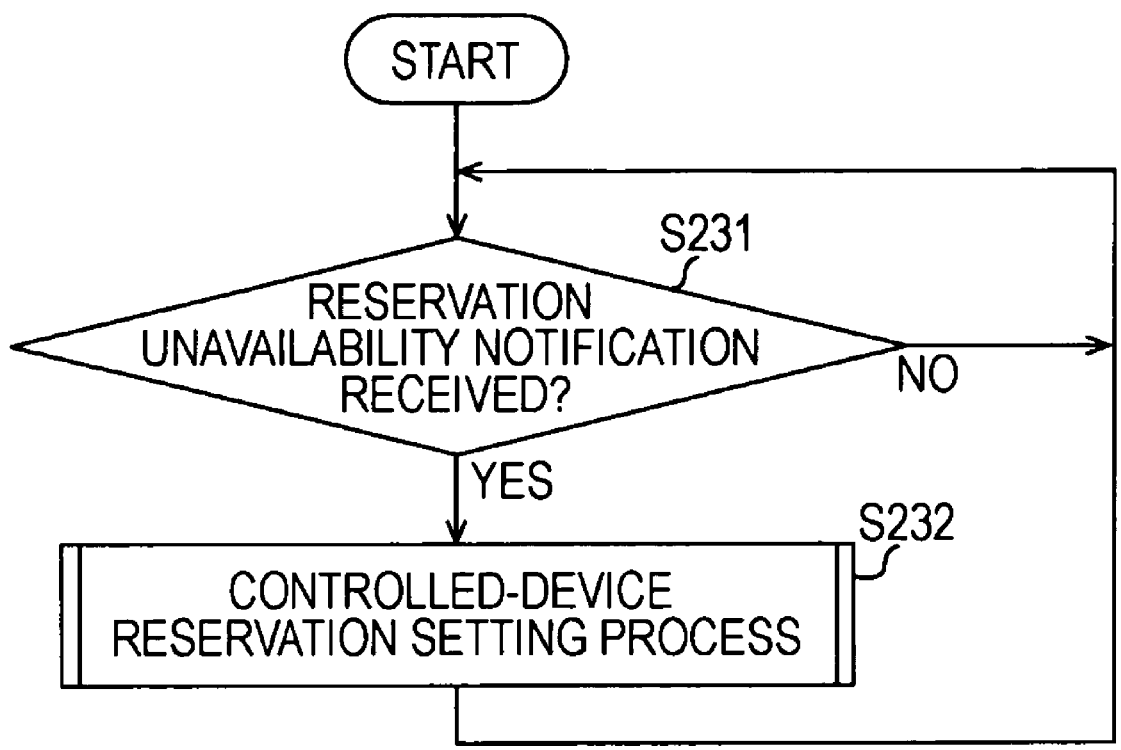
FIG. 20 is a flowchart showing the details of a video recording process performed by the controller.

FIG. 19 is a flowchart showing a video recording process performed by the video recorder 13. A recording scheduling process will be described in the context of a recording scheduling process performed by the video recorder 13-i.

In step S211, the recording processor 205 determines whether or not a predetermined time has arrived. For example, the recording processor 205 of the video recorder 13-i determines whether or not a time immediately before the set recording start time of the reserved broadcast program, namely, "20:00", has arrived on the basis of the reservation information retrieved from the reservation information manager 202 of the video recorder 13-i.

If it is determined in step S211 that the predetermined time has not arrived, the process returns to step S211, and the processing described above is repeatedly performed. That is, the video recorder 13 stands by until a time immediately before the start of the video recording.

If it is determined in step S211 that the predetermined time has arrived, then, in step S212, the recording processor 205 determines whether or not the video recorder 13 is busy.

If it is determined in step S212 that the video recorder 13 is busy, the video recorder 13 is not able to perform the recording, and then, in step S216, the reservation processor 201 causes the communication unit 56 to transmit a reservation-unavailability notification indicating that the recording reservation is not available to the controller 11 via the network 12 in order to set a recording reservation in another video recorder 13 (or the controller 11).

For example, in the middle of playback or the like, if the recording processor 205 determines that the video recorder 13-i is busy, for example, the reservation processor 201 of the video recorder 13-i generates a reservation-unavailability notification, and supplies the generated reservation-unavailability notification to the communication unit 56 of the video recorder 13-i. The communication unit 56 transmits the reservation-unavailability notification to the controller 11 via the network 12.

If it is determined in step S212 that the video recorder 13 is not busy, then, in step S213, the recording processor 205 determines whether a storage device is connected. For example, the recording processor 205 determines whether or not the storage device 59 is connected to the data input/output interface 58.

If it is determined in step S213 that no storage device is connected, as described above, the video recorder 13 is not able to perform the recording, and, in step S216, the reservation processor 201 causes the communication unit 56 to transmit a reservation-unavailability notification to the controller 11 via the network 12 in order to set a recording reservation in another video recorder 13 (or the controller 11).

For example, when the recording processor 205 determines that the storage device 59, which is a DVD, is not set in the drive (data input/output interface 58), the reservation processor 201 of the video recorder 13-i generates a reservation-unavailability notification, and supplies the generated reservation-unavailability notification to the communication unit 56 of the video recorder 13-i. The communication unit 56 transmits the reservation-unavailability notification to the controller 11 via the network 12.

If it is determined in step S213 that a storage device is connected, then, in step S214, the recording processor 205 determines whether or not the recording capacity of the storage device is sufficient. For example, the recording processor 205 of the video recorder 13-i determines whether or not the recording capacity of the storage device 59 of the video recorder 13-i connected to the data input/output interface 58 of the video recorder 13-i, which is a hard disk, is sufficient.

If it is determined in step S214 that the recording capacity of the storage device is insufficient, as described above, the video recorder 13 is not able to perform the recording, and, in step S216, the reservation processor 201 causes the communication unit 56 to transmit a reservation-unavailability notification to the controller 11 via the network 12 in order to set a recording reservation in another video recorder 13 (or the controller 11).

For example, if the recording processor 205 determines that the recording capacity of the storage device 59, which is a hard disk, is insufficient, the reservation processor 201 of the video recorder 13-$i$ generates a reservation-unavailability notification, and supplies the generated reservation-unavailability notification to the communication unit 56 of the video recorder 13-$i$ to transmit the reservation-unavailability notification to the controller 11 via the network 12.

If it is determined in step S214 that the recording capacity of the storage device is sufficient, then, in step S215, the recording processor 205 starts the recording of the broadcast program. Then, the process ends. For example, the recording processor 205 of the video recorder 13-$i$ causes the codec processor 57 of the video recorder 13-$i$ to perform the recording of channel "BS digital broadcast, channel 105" onto the storage device 59 of the video recorder 13-$i$, which is a hard disk, in a time zone from 20:00 to 20:59 on the basis of the reservation information retrieved from the reservation information manager 202 of the video recorder 13-$i$.

Accordingly, when the set recording reservation is not available, the video recorder 13 sends a reservation-unavailability notification to the controller 11 so that the controller 11 can again search for a device satisfying the conditions and can set a recording reservation in the searched device via the network 12.

While the description has been made in the context of the video recorder 13-$i$, the video recorder 13-$j$ also performs the video recording process in a similar manner.

The details of the video recording process performed by the video recorder 13 have been described. The details of a video recording process performed by the controller 11 will be described with reference to FIG. 20. The video recording process is performed by the controller 11 that receives the reservation-unavailability notification transmitted from the video recorder 13 in the processing of step S216 shown in FIG. 19.

In step S231, the external reservation processor 107 determines whether or not a reservation-unavailability notification has been received on the basis of a reservation-unavailability notification that is transmitted from the video recorder 13 and that is supplied from the communication unit 36.

If it is determined in step S231 that no reservation-unavailability notification has been received, the process returns to step S231, and the processing described above is repeatedly performed. That is, the controller 11 stands by until a reservation-unavailability notification has been received from the video recorder 13 via the network 12.

If it is determined in step S231 that a reservation-unavailability notification has been received, then, in step S232, the external reservation processor 107 performs a controlled-device reservation setting process to set a recording reservation in another video recorder 13, except for the video recorder 13 that has transmitted the reservation-unavailability notification. The controlled-device reservation setting process is similar to the controlled-device reservation setting process described above with reference to FIGS. 9 to 14, and a description is thus omitted.

The details of the video recording process performed by the controller 11 have been described.

According to an embodiment of the present invention, therefore, a broadcast program can be recorded without fail. According to an embodiment of the present invention, further, the controller 11 specifies a device satisfying the conditions via the network 12, and sets a recording reservation in the specified device. Therefore, a system efficiently utilizing existing home equipment can be established.

Further, the controller 11 specifies a video recorder 13 satisfying the conditions set by the user via the network 12, and sets reservation information in the specified video recorder 13. Therefore, the recording reservations on a plurality of video recorders 13 can be centrally managed by the controller 11, and can easily be implemented.

Further, when the set recording reservation is not available on the controller 11 or a video recorder 13, the reservation information is set again in another video recorder 13. This ensures that the recording is performed at the set recording start time.

The present invention is not limited to the video recording of broadcast signals corresponding to television broadcast waves fed from tuners or the like, such as terrestrial or BS radio waves received from antennas. For example, the present invention can be applied to the recording of audio content from radio broadcasts or the like or video content provided by the server 14.

The series of processes described above may be implemented in hardware or in software. When the series of processes is implemented in software, a program of the software is installed from a recording medium onto a computer included in dedicated hardware or, e.g., a general-purpose PC or the like that is capable of executing various functions with various programs installed thereon.

The recording medium may be a packaged medium carrying the programs, which is distributed to provide the programs to a user separately from the computer, such as the storage device 41 or storage device 59 shown in FIG. 2 or 3. Alternatively, the recording medium may be implemented as the ROM 33 or ROM 53 carrying the programs, which are provided to a user as included in advance in the computer.

Further, a program executing the series of processes described above may be installed in the computer via a wired or wireless communication medium, such as a local area network, the Internet, digital satellite broadcasting, by means of an interface, such as a router or modem.

In this specification, steps defining the programs stored in the recording medium may include processes that are executed in a time-series manner according to the order described, and also include processes that are executed in parallel or individually, not necessarily executed in a time-series manner.

In this specification, the term system means the entire apparatus that is composed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
a first recording apparatus; and
a second recording apparatus,
wherein the first recording apparatus includes
determining means for determining whether or not recording of a broadcast program is settable in the first recording apparatus on the basis of first information for reservation of the recording of the broadcast program and second information for selecting an apparatus to be used to record the broadcast program, and
first transmitting means for transmitting third information for requesting the state of the apparatus corresponding to the second information to the second recording apparatus when it is determined that the recording is not settable, the second recording apparatus includes
first receiving means for receiving the third information transmitted from the first recording apparatus, and
second transmitting means for transmitting fourth information concerning the state of the second recording apparatus to the first recording apparatus in response to the third information, the first recording apparatus further includes
second receiving means for receiving the fourth information transmitted from the second recording apparatus, and
evaluating means for evaluating a priority level assigned to the second recording apparatus that has transmitted the fourth information on the basis of the fourth information, and the first transmitting means transmits the first information to the second recording apparatus according to the priority level.

2. A recording apparatus for recording a broadcast program, the recording apparatus comprising:
first determining means for determining whether or not recording of a broadcast program is settable in the recording apparatus on the basis of first information for reservation of the recording of the broadcast program and second information for selecting an apparatus to be used to record the broadcast program;
transmitting means for transmitting third information for requesting the state of the apparatus corresponding to the second information to other apparatuses when it is determined that the recording is not settable;
receiving means for receiving fourth information concerning the state of the other apparatuses transmitted from the other apparatuses in response to the third information;
evaluating means for evaluating priority levels assigned to the other apparatuses that have transmitted the fourth information on the basis of the fourth information,
wherein the transmitting means transmits the first information to the other apparatuses according to the priority levels.

3. The recording apparatus according to claim 2, further comprising:
first accepting means for accepting a selection of the first information according to an operation performed by a user; and
second accepting means for accepting a selection of the second information according to an operation performed by the user,
wherein the first determining means determines whether or not the recording of the broadcast program is settable in the recording apparatus on the basis of the selected first information and the selected second information.

4. The recording apparatus according to claim 2, further comprising generating means for generating the third information based on the second information,
wherein the transmitting means transmits the generated third information to the other apparatuses.

5. The recording apparatus according to claim 2, further comprising generating means for generating fifth information for sharing the recording of the broadcast program between a plurality of the other apparatuses based on the fourth information and the priority levels,
wherein the transmitting means transmits the generated fifth information to the other apparatuses.

6. The recording apparatus according to claim 2, further comprising second determining means for determining whether or not the recording apparatus is able to record the broadcast program thereon at a time a predetermined time before a set recording start time of the broadcast program,
wherein the transmitting means transmits the third information to the other apparatuses when it is determined that the recording is not settable.

7. The recording apparatus according to claim 2, wherein the receiving means receives fifth information transmitted from one of the other apparatuses indicating that the one apparatus is not able to record a reserved broadcast program, and
the transmitting means transmits the third information to another of the other apparatuses in response to the received fifth information.

8. A recording method for a recording apparatus for recording a broadcast program, the recording method comprising the steps of:
determining whether or not recording of a broadcast program is settable on the basis of first information for reservation of the recording of the broadcast program and second information for selecting an apparatus to be used to record the broadcast program;
controlling transmission of third information for requesting the state of the apparatus corresponding to the second information to other apparatuses when it is determined that the recording is not settable;
controlling reception of fourth information concerning the state of the other apparatuses transmitted from the other apparatuses in response to the third information; and
evaluating priority levels assigned to the other apparatuses that have transmitted the fourth information on the basis of the fourth information,
wherein in the step of controlling transmission, transmission of the first information to the other apparatuses is controlled according to the priority levels.

9. A non-transitory computer program product having instructions that when executed by a processor cause a computer to execute a recording process for recording a broadcast program, the program comprising the steps of:
determining whether or not recording of a broadcast program is settable on the basis of first information for reservation of the recording of the broadcast program and second information for selecting an apparatus to be used to record the broadcast program;
controlling transmission of third information for requesting the state of the apparatus corresponding to the second information to other apparatuses when it is determined that the recording is not settable;
controlling reception of fourth information concerning the state of the other apparatuses transmitted from the other apparatuses in response to the third information; and
evaluating priority levels assigned to the other apparatuses that have transmitted the fourth information on the basis of the fourth information,
wherein in the step of controlling transmission, transmission of the first information to the other apparatuses is controlled according to the priority levels.

10. A communication system comprising:
a first recording apparatus; and
a second recording apparatus,
wherein the first recording apparatus includes
a determining unit determining whether or not recording of a broadcast program is settable in the first recording apparatus on the basis of first information for reservation of the recording of the broadcast program and second information for selecting an apparatus to be used to record the broadcast program, and a first transmitter transmitting third information for requesting the state of the apparatus corresponding to the second information to the second recording apparatus when it is determined that the recording is not settable, the second recording apparatus includes a first receiver receiving the third information transmitted from the first recording apparatus, and a second transmitter transmitting fourth information concerning the state of the second recording apparatus to the first recording apparatus in response to the third information, the first recording apparatus further includes a second receiver receiving the fourth information transmitted from the second recording apparatus, and an evaluating unit evaluating a priority level assigned to the second recording apparatus that has transmitted the fourth information on the basis of the fourth information, and the first transmitter transmits the first information to the second recording apparatus according to the priority level.

11. A recording apparatus for recording a broadcast program, the recording apparatus comprising:

a first determining unit determining whether or not recording of a broadcast program is settable in the recording apparatus on the basis of first information for reservation of the recording of the broadcast program and second information for selecting an apparatus to be used to record the broadcast program;

a transmitter transmitting third information for requesting the state of the apparatus corresponding to the second information to other apparatuses when it is determined that the recording is not settable;

a receiver receiving fourth information concerning the state of the other apparatuses transmitted from the other apparatuses in response to the third information;

an evaluating unit evaluating priority levels assigned to the other apparatuses that have transmitted the fourth information on the basis of the fourth information, wherein the transmitter transmits the first information to the other apparatuses according to the priority levels.

* * * * *